United States Patent
Gidumal

(10) Patent No.: US 6,296,691 B1
(45) Date of Patent: Oct. 2, 2001

(54) MULTI-FUNCTIONAL MOLDED FILTER FOR REMOVING CONTAMINANTS FROM AN ENCLOSURE

(75) Inventor: Rajan Gidumal, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 09/433,243

(22) Filed: Nov. 4, 1999

Related U.S. Application Data

(60) Provisional application No. 60/155,290, filed on Sep. 21, 1999.

(51) Int. Cl.[7] ............................................. B03C 3/30
(52) U.S. Cl. .................... 96/17; 55/385.6; 55/486; 55/DIG. 5; 55/DIG. 39; 96/68; 96/135; 96/154; 360/97.02
(58) Field of Search .................... 96/17, 68, 69, 96/135, 139, 147, 153, 154; 55/385.6, 486, DIG. 39, DIG. 5, DIG. 12; 264/DIG. 48; 360/97.02

(56) References Cited

U.S. PATENT DOCUMENTS

| | | | |
|---|---|---|---|
| 4,633,349 | 12/1986 | Beck et al. | 55/501 X |
| 4,830,643 | 5/1989 | Sassa et al. | 55/316 |
| 4,857,087 | 8/1989 | Bolton et al. | 55/385.6 |
| 4,863,499 | 9/1989 | Osendorf | 55/316 |
| 4,902,423 | 2/1990 | Bacino | 210/500.36 |
| 5,030,260 | 7/1991 | Beck et al. | 55/316 |
| 5,124,856 | 6/1992 | Brown et al. | 360/97.03 |
| 5,406,431 | 4/1995 | Beecroft | 360/97.02 |
| 5,417,743 | 5/1995 | Dauber | 96/13 |
| 5,447,695 | 9/1995 | Brown et al. | 422/171 |
| 5,500,038 | 3/1996 | Dauber et al. | 96/135 |
| 5,538,545 | 7/1996 | Dauber et al. | 96/153 |
| 5,590,001 | * 12/1996 | Ino et al. | 360/97.02 |
| 5,593,482 | 1/1997 | Dauber et al. | 96/135 |
| 5,869,009 | * 2/1999 | Bellefeville et al. | 96/153 X |
| 5,876,487 | 3/1999 | Dahlgren et al. | 96/13 |
| 5,879,527 | * 3/1999 | Kiesele et al. | 96/135 X |
| 5,997,614 | * 12/1999 | Tuma et al. | 55/385.6 X |
| 6,077,335 | * 6/2000 | Schneider et al. | 96/147 X |
| 6,128,159 | * 10/2000 | Ino | 360/97.02 |
| 6,171,375 | * 1/2001 | Howie | 96/17 |
| 6,214,095 | * 4/2001 | Logan et al. | 96/154 X |

FOREIGN PATENT DOCUMENTS

| | | |
|---|---|---|
| 19814514 | 12/1998 | (DE) . |
| WO 97/00717 | 1/1997 | (WO) . |

OTHER PUBLICATIONS

International Search Report for PCT/US00/25806 (2 pages), Dec. 29, 2000.

* cited by examiner

Primary Examiner—Richard L. Chiesa
(74) Attorney, Agent, or Firm—Carol A. Lewis White

(57) ABSTRACT

The present invention is an improved molded filter which performs multiple filtration functions within an enclosed environment, such as within a computer hard disk drive. In a first embodiment, the filter is capable of removing particulate contaminants from both incoming (external) air and recirculating air by performing both breather and recirculation functions when placed over a breather hole in a disk drive. In an alternative embodiment, the filter also incorporates an adsorbent material which allows it to remove both particulate and vapor phase contaminants from incoming (external) air and recirculating air within the disk drive.

19 Claims, 13 Drawing Sheets

MULTI-FUNCTIONAL MOLDED FILTER FOR REMOVING CONTAMINANTS FROM AN ENCLOSURE

RELATED APPLICATIONS

The present application is a regular application based on co-pending United States Provisional Patent Application No. 60/155,290 filed Sept. 21, 1999.

FIELD OF THE INVENTION

This invention relates to a device for filtering contaminants, such as particulates and vapor phase contaminants, from a confined or enclosed environment such as electronic or optical devices susceptible to contamination (e.g. computer disk drives) by incorporating multiple filtration functions into a single filter.

BACKGROUND OF THE INVENTION

Many enclosures that contain sensitive instrumentation must maintain very clean environments in order to operate properly. Examples include the following: enclosures with sensitive optical surfaces, or electronic connections that are sensitive to particulates and gaseous contaminants which can interfere with mechanical, optical, or electrical operation; data recording devices, such as computer hard disk drives that are sensitive to particles, organic vapors, and corrosive vapors; enclosures for processing, transport or storage of thin films and semiconductor wafers; and electronic control boxes such as those used in automobiles and industrial applications that can be sensitive to particles, moisture buildup, and corrosion, as well as contamination from fluids and vapors. Contamination in such enclosures originates from both inside and outside the enclosures. For example, in computer hard drives, damage may result from external contaminants as well as from particles and outgassing generated from internal sources. The terms "hard drives" or "hard disk drives" or "disk drives" or "drives" will be used herein for convenience and are understood to include any of the enclosures mentioned above.

One serious contamination-related failure mechanism in computer disk drives is static friction or "stiction". Stiction results from the increased adhesion of a drive head to a disk while the disk is stationary plus increased viscous drag parallel to the head-disk interface. Newer high density disks are more sensitive to contamination-caused stiction because they are smoother and only thin layers of lubricants are present. Contaminants on the disk change the surface energy and the adhesive forces between the head and disk, which cause stiction. Also, vapors that condense in the gap between the head and disk can cause stiction. Further exacerbating these effects are the newer lower energy, lower torque motors being used in smaller disk drives for portable computers.

Another serious contamination-related failure mechanism in computer disk drives is head crashes. Head crashes can occur when particles get into the head disk interface. Newer high density drives have 30 nanometer or less flying heights or spacing between the head and disk during operation and typically have disks rotating 5400 revolutions per minute or greater. Even submicron-sized particles can be a problem, causing the head to crash into the particle or the disk after flying over a particle, bringing the drive to an abrupt failure mode. Particles can also adversely affect data integrity and mechanical reliability of a drive, sometimes referred to as thermal asperity.

In addition, disk drives must be protected against a large number of contaminants in the surrounding environment that can penetrate the drive. This is true for drives used in small to medium sized computer systems which may not be used in the typical data processing environment and is especially true in drives that are removable and portable to any environment such as disk drives that are used in laptop computers or in Personal Computer Memory Card International Association (PCMCIA) slots.

Filtration devices to keep particles from entering these enclosures are well known. They may consist of a filtration media held in place by a housing of polycarbonate, acrylonitrile butadiene styrene (ABS), or some other material; or they may consist of a filtration media in the form of a self-adhesive disk utilizing a layer or layers of pressure sensitive adhesive. These devices are mounted and sealed over a vent hole in the enclosure to filter particulates from the air entering the drive. Filtration performance depends not only on the filter having a high filtration efficiency but also on having a low resistance to air flow so that unfiltered air does not leak into the enclosure through a gasket or seam instead of entering through the filter. Such filters work well for particulates of external origin, but do not address the problems from vapor phase contaminants.

Combination sorbent breather filters to keep particulates and vapors from entering enclosures are also well known. These can be made by filling a cartridge of polycarbonate, ABS, or similar material with sorbent and securing filter media on both ends of the cartridge. Examples of such filters are described in U.S. Pat. No. 4,863,499 issued to Osendorf (an anti-diffusion chemical breather assembly for disk drives with filter media having a layer impregnated with activated charcoal granules); U.S. Pat. No. 5,030,260 issued to Beck et al. (a disk drive breather filter including an assembly with an extended diffusion path; U.S. Pat. No. 5,124,856 issued to Brown et al. (a unitary filter medium with impregnated activated carbon filters to protect against organic and corrosive pollutants); and U.S. Pat. No. 5,447,695 issued to Brown et al. (Chemical Breather Filter Assembly). Unfortunately, many of these designs are too large and take up too much space in today's miniaturized drives. They again filter only incoming air of particles and mainly incoming air of vaporous contaminants, although some internal air can also be cleaned from internally generated vaporous contaminants since the filters are inside the drive and these contaminants will diffuse into the adsorbent sections of the filters. None of these filters address cleaning the air of internal particles.

A second combination adsorbent breather filter is also well known that encapsulates the adsorbent material such as an impregnated activated carbon polytetrafluoroethylene (PTFE) composite layer between two layers of filter media and is applied over a hole in the enclosure with a layer of pressure sensitive adhesive. These filters work well and are of a size that can be used in today's small drives but are typically designed to filter air coming into the drive. Thus, the adsorbent is typically primarily desired to adsorb both organic and corrosive vapors from the outside environment and will filter particulates only from air coming into or leaving the drive. Internally generated vapors can be adsorbed by these filters, but often times they are used in conjunction with another internal adsorbent so they can be smaller in size; therefore, such filters do not contain enough adsorbent to adequately adsorb all the internally generated contaminants. Again, particles are also generated inside the drive and are not typically captured by these filters.

A diffusion tube can be included with either the initial particulate breather filter or an adsorbent breather filter as described in U.S. Pat. No. 5,417,743 by Dauber. Diffusion tubes provide additional protection against vaporous contaminants (including moisture) entering the drive through the breather opening by providing a diffusion barrier in the form of the diffusion tube which creates a tortuous or a longer path for air to travel before entering the drive enclosure. Diffusion tubes reduce the number of contaminants reaching the interior of the enclosure (and/or the adsorbent depending on the location of the filter) and increase the humidity time constants or time required to reach humidity equilibrium with the environment. As used herein, for convenience, the term "diffusion tube" may refer to either a conventional tortuous path or it may refer to a non-tortuous cavity into which incoming air passes before entering the filter.

Internal particulate filters, or recirculation filters, are also well known. These filters are typically pieces of filter media, such as expanded PTFE membrane laminated to a polyester nonwoven backing material, or "pillow-shaped" filters containing electret (i.e., electrostatic) filter media. They are pressure fit into slots or "C" channels and are placed in the active air stream such as near the rotating disks in a computer hard disk drive or in front of a fan in electronic control cabinets, etc. Alternatively, the recirculation filter media can be framed in a plastic frame. These filters work well for particulate removal of internally generated particles, but do not address the problem of vapor phase contaminants, nor do they provide ultimate protection from external particles entering the drive.

Internal adsorbent filters are also well known. One example is described in U.S. Pat. No. 4,830,643 issued to Sassa et al. This patent teaches a sorbent filter where a powdered, granular or beaded sorbent or sorbent mixture is encapsulated in an outer expanded PTFE tube. This filter is manufactured by W. L. Gore & Associates, Inc., Elkton, Md., and is commercially available under the trademark GORE-SORBER® module. While this filter is highly effective at collecting vapor phase contaminants, it is currently only available in large and medium sizes like filter volumes down to about 3 cc. In its present form, this filter is incapable of fully addressing the growing needs for even smaller and more compact sorbent filters, nor is it designed to filter the internal air of particulate contamination. A second well known internal adsorbent assembly incorporates a layer of adsorbent, such as activated carbon/PTFE composite, between an encapsulating filter layer and layer of pressure sensitive adhesive that helps encapsulate the adsorbent as well as provides a means of mounting the adsorbent assembly on an interior wall in the enclosure. Such a filter is described in U.S. Pat. No. 5,593,482 issued to Dauber et al. Again neither of these filters address particulate contaminants. A third internal adsorbent assembly incorporates a layer of adsorbent such as activated carbon/PTFE composite between two layers of filter media or is alternately wrapped in a layer of filter media and can be installed between slots or "C" channels much the way a recirculation filter is installed but without much air flow through the filter. Such a filter is described in U.S. Pat. No. 5,500,038 issued to Dauber et al., and, as with the other filters mentioned, this construction does not provide significant particle capturing capability.

As stated above, all of these internal adsorbent filters work well at adsorbing vapor phase contaminants, but they do not filter particulates very well. They can collect particles by some impaction of particles onto the filter (i.e., by having the larger particles impacting or colliding with the adsorbent filter as particle-laden air speeds around the filters) or by diffusion of particles onto the filter. However, these filters do not perform nearly as well as standard recirculation filters that work by a combination of sieving (mechanically capturing particles too large to pass through the pore structure of the filter), impaction (capturing particles too large to follow the bending air streams around filters or the fibers of the filter), interception (capturing particles that tend to follow the air streams, but are large enough to still intercept a filter fiber or, in other words, those particles with a diameter equal to or less than the distance between the fiber and the air stream line), and diffusion (capturing smaller particles buffeted about by air molecules in a random pattern and coming into contact with a filter fiber to become collected).

A commercially available adsorbent recirculation filter, available from the Donaldson Company, Inc. incorporates activated carbon beads glued to a nonwoven carrier that is sandwiched between two layers of electret filter material and two layers of plastic support screen. This filter provides some sorbent protection at the sacrifice of some internal particle filtration effectiveness, as this construction appears to increase resistance to air flow to the filter relative to a conventional recirculation filter. The sorbent capability is limited, however, due to, for example, the constraints of the filter size and the blockage of sorbent surface area by the glue holding the carbon to the carrier. Moreover, this filter does not filter particles from air entering the drive.

Another issue in today's drives is contamination due to corrosive ions such as chlorine and sulfur dioxide. To adsorb these compounds the adsorbent is typically treated with a salt to chemisorb the contaminants. When the filters described in the preceding paragraph were washed in deionized water, large amounts of these salts were released, making it unacceptable to today's sensitive disk drive environments. An alternative washable adsorbent recirculation filter is described in U.S. Pat. No. 5,538,545 issued to Dauber et al., wherein expanded PTFE membranes or other hydrophobic materials are used to encapsulate the adsorbent. However, these filters still do not filter air as it comes into the drive before it has had a chance to deposit particles and do damage to the drive.

Combinations of several filters having different functions in a single drive have been taught. For example, U.S. Pat. No. 5,406,431, to Beecroft, describes a filter system for a disk drive that includes an adsorbent breather and recirculation filter in specifically identified locations within the drive. Also, U.S. Pat. No. 4,633,349, by Beck et al., teaches a disk drive filter assembly comprising a dual media drum type filter element in a recirculating filter assembly that surrounds a breather filter. Further, U.S. Pat. No 4,857,087, to Bolton et al., teaches incorporating a breather filter in a recirculation filter housing, but has significantly more parts and incorporates a third filter element complete with housings, aperatures, and gaskets to accomplish this inclusion. The combinations described in these patents either locate the filter components in separate regions of the disk drive or incorporate space-consuming fixtures to orient the component parts within the drives.

As disk drives have become smaller and the prices have declined, there has been a push for simplification and the reduction in the number of parts in a drive to reduce cost and improve performance. Also, as the drives continue to increase in recording data density and capacity, they continue to become more sensitive to particulate and vaporous contamination, such that the existing filtration means often do not meet these ever more demanding filtration requirements.

Accordingly, a primary purpose of the present invention is to provide an improved molded filter for an enclosed environment that can filter both incoming (external) air and internal recirculating air of particulates. A further purpose of the invention is to provide an improved molded filter that can perform multiple functions for filtering both incoming (external) air and internal recirculating air of both particulates and vapor phase contaminants.

A further purpose of the present invention is to provide a molded multiple function part, as described above, which further incorporates a diffusion tube.

A further purpose of the present invention is to provide a multiple function part, as described above, which further incorporates a gasket to help to seal the disk drive.

A further purpose of the present invention is to provide a multiple function part, as described above, which further incorporates a dampening material to help to reduce vibration within the disk drive.

These and other purposes will be apparent based on the following description.

SUMMARY OF THE INVENTION

The present invention is an improved molded filter which performs multiple filtration functions within an enclosed environment, such as within a computer hard disk drive. In a first embodiment, the filter is capable of removing particulate contaminants from both incoming (external) air and recirculating air by performing both breather and recirculation functions when placed over a breather hole in a disk drive. In an alternative embodiment, the filter also incorporates an adsorbent material which allows it to remove both particulate and vapor phase contaminants from incoming (external) air and recirculating air within the disk drive.

The molded filter of the present invention includes a layered construction comprising at least one protective support layer, at least one first filter layer selected from an electret and a triboelectret material, and at least one second filter layer, this layered construction being molded so that it has a permanent three-dimensional shape defining a cavity. As used herein, "permanent" is intended to refer to a three dimensional shape that is self-supporting and does not require any external supports to retain the shape once formed. However, "permanent" should not be construed to mean that it is not deformable when subjected to an external force (e.g., crushing, or the like).

At least one substantially planar filter layer is located adjacent to and covering the cavity in the layered construction. As used herein, the term "substantially planar" is intended to mean that the layer lies substantially in a single plane to conform to an interior region of the enclosure. The substantially planar filter layer and the layered construction are sealed together by a suitable perimeter seal, as described in more detail herein. In an alternative preferred embodiment, an optional adsorbent material is contained in the cavity and is capable of filtering vapor phase contaminants within the disk drive. In an alternative embodiment, the filter further optionally includes a diffusion tube. Further, depending on the requirements of the disk drive, it is also possible to attach to the filter a gasket material for sealing the disk drive or a dampening material to reduce vibration within the drive.

DETAILED DESCRIPTION OF THE INVENTION

The present invention is an improved molded filter which performs multiple filtration functions within an enclosed environment, such as within a computer hard disk drive. In a first embodiment, the filter is capable of removing particulate contaminants from both incoming (external) air and recirculating air by performing both breather and recirculation functions when placed over a breather hole in a disk drive. In an alternative embodiment, the filter also incorporates an adsorbent material which allows it to remove both particulate and vapor phase contaminants from incoming (external) air and recirculating air within the disk drive.

Figure 1A:
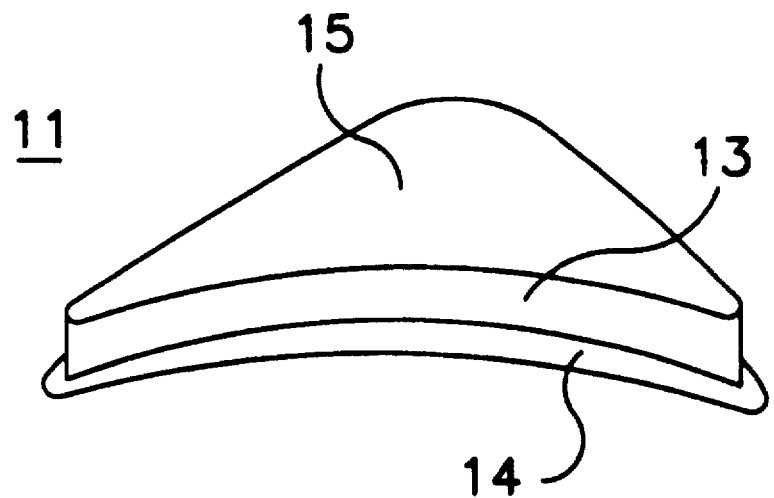
FIG. 1A is a top perspective view of one embodiment of the improved molded multi-functional filter of the present invention.
Figure 1B:
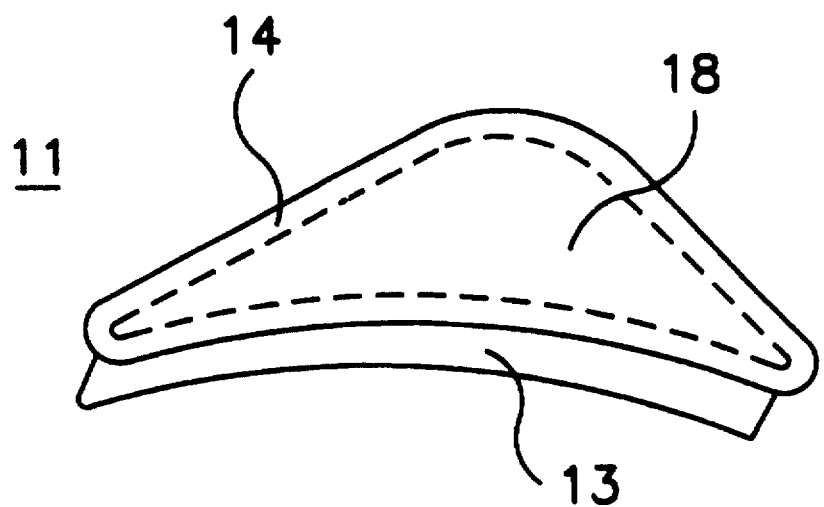
FIG. 1B is a bottom perspective view of the filter shown in FIG. 1A.

Referring to FIGS. 1A and 1B, there are shown top perspective and bottom perspective views of one embodiment of the present invention. Particularly, the filter element 11 has a geometry which is adapted to fit into a corner of a disk drive with a curved edge 13 which substantially mirrors the curvature of a disk within a disk drive (not shown). The molded section 15 is attached to a substantially planar filter layer 18 by a perimeter seal 14, the inner edge of the seal being shown in dotted line perspective in FIG. 1B.

Figure 2A:
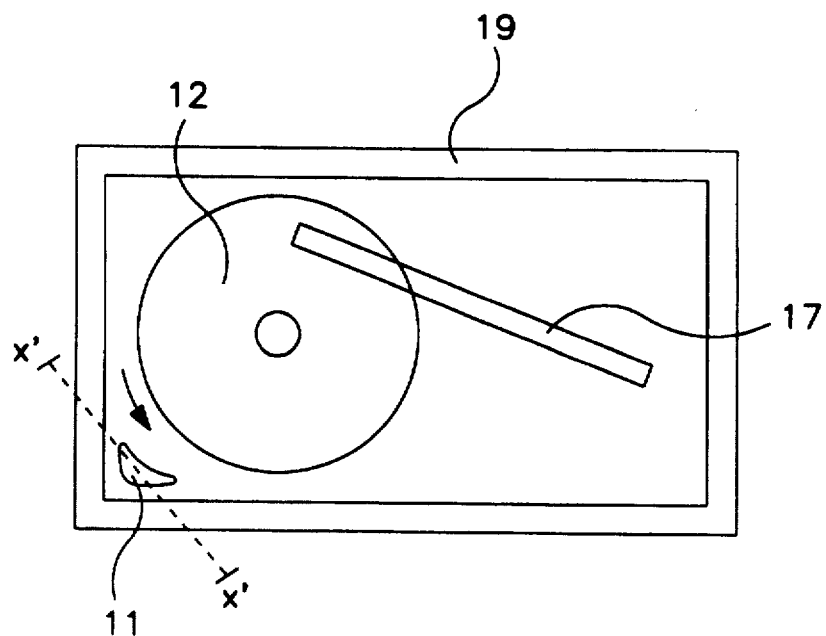
FIG. 2A is a top view of one embodiment of the present invention positioned in a computer disk drive assembly.
Figure 2B:
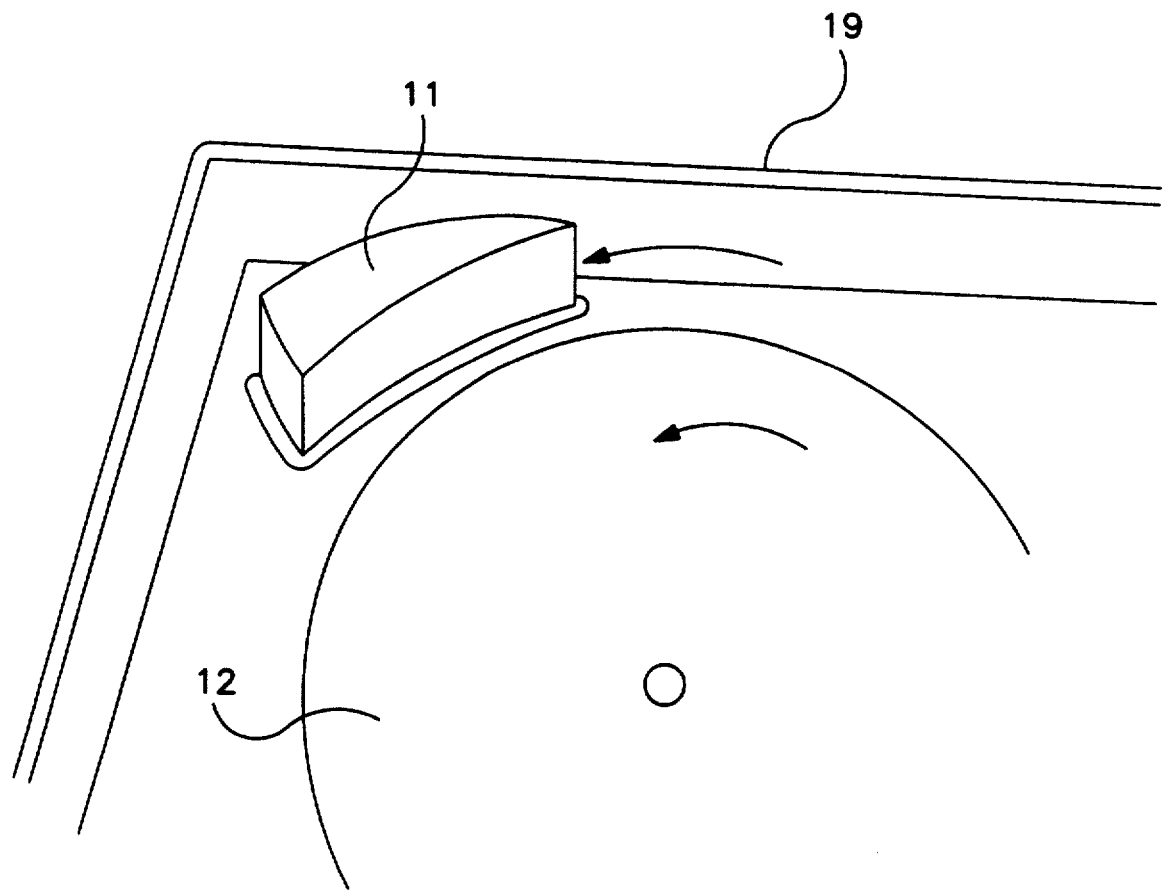
FIG. 2B is a perspective view along line x–x' of FIG. 2A.

FIGS. 2A and 2B show an example of the placement of a multi-functional filter 11 of the present invention mounted in a conventional disk drive assembly 19. As can be seen, the filter assembly of the present invention is small enough that it can be placed virtually anywhere in the disk drive assembly 19 and is typically put into an area of high air flow generated from a spinning data storage disk or disks 12, the direction of spin and air flow indicated by the arrow. This forces air through the filter effecting particulate filtration and gives greater access of the adsorbent, when present, to the vapor contaminants. In addition, when the breather hole of the disk drive assembly (not shown) is covered by the filter, incoming air is also filtered of particulate and/or vapor phase contaminants. Filtration occurs as the air passes through the filtration layers which collect particulate and as the air passes through the adsorbent, which picks up vapor phase contaminants. The filter may be held in place by any suitable means, preferably by an adhesive or other means which is capable of sealing the filter around the breather hole in the disk drive housing so that unfiltered incoming air does not leak beneath the filter and into the drive. Another conventional element shown in FIG. 2A is the positioning armature 17.

Figure 3:
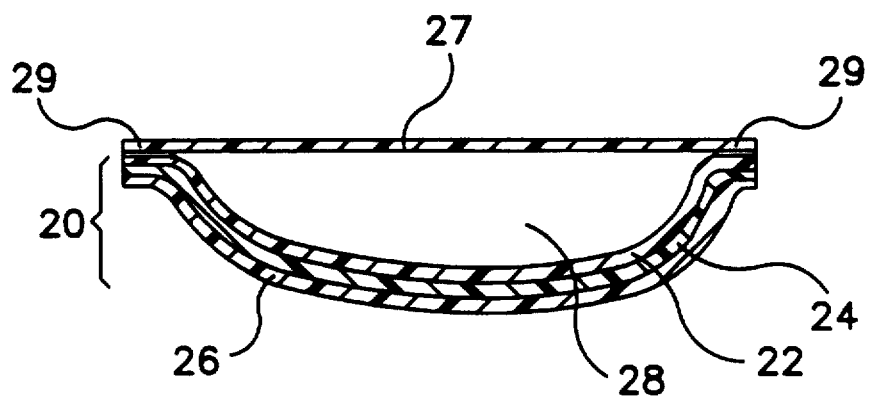
FIG. 3 is a cross-sectional view of one embodiment of the present invention.

Referring to FIG. 3, there is shown a cross-sectional view of one embodiment of the multi-functional filter of the present invention. Particularly, the molded layered construction 20 includes an inner (or second) filter layer 22 which is capable of filtering particulates. Suitable filter layers may include filter papers or filter membranes such as polypropylene membranes or cast polymeric membranes or some combination of filter materials. A preferred filter layer is expanded PTFE membrane. In a particularly preferred embodiment, the filter layer is a layer of expanded PTFE membrane made in accordance to U.S. Pat. No. 4,902,423 issued to Bacino et al., specifically incorporated herein by reference. This filter media would be structurally supported (e.g., by lamination, etc.) by a layer of woven, non-woven or expanded porous material such as polyester, polypropylene, polyamide, etc. This filter media has several advantages. It can be made very highly permeable, with resistances to air flow of less than 1.0 mm $H_2O$ @ 10.5 feet per minute (3.2 meters per minute). The particle filtration efficiency of this highly expanded membrane is also very high (e.g., in excess of 55% at 0.3 micron) which provides good particle filtration. In addition, in cases where an adsorbent is contained in the cavity of the filter, this filter material provides good adsorbent containment.

Another filtration layer 24 (the "first" layer) which is part of the molded layered construction comprises an electret or triboelectret material which is also capable of filtering particles in an air stream. Preferred is a layer of triboelectric material made of PTFE and polyamide fibers such as that commercially available from W. L. Gore and Associates, Inc. under the trademark GORE-TRET® recirculation media. Advantages of this media are that it is very high in efficiency (e.g., in excess of 90% @ 0.3 pm) and also very permeable (e.g., less than 1 mm H,O @ 10.5 fpm or 3.2 m/mm). While this media loses its electrostatic efficiency while being washed with deionized water, it immediately regains its efficiency upon drying due to the triboelectric effect of the mix of fibers. Other electrets or triboelectret filter materials of high efficiency and low resistance to air flow can also be used.

An outer protective layer 26 can also be used to add durability to the filter and to contain any protruding fibers from either the triboelectric filter media or the filter support material for the expanded PTFE filter media. Typically, this would be an extruded or expanded plastic material of polypropylene, polyamide, polyester, porous polytetrafluoroethylene, etc. Alternatively, the outer protective layer could be a knit, woven or non-woven material. A preferred material is a Delnet 0707 expanded polypropylene material, available from Applied Extrusion Technologies, Inc., Middletown, Del.

The molded layered construction can be formed by any suitable means which provides a permanent three-dimensional shape defining a cavity therein. A preferred molding technique includes placing the layers into a male and female die set and applying heat and pressure to form the layered construction. In a preferred embodiment, the layers are placed in a room temperature mold and contacted with a heated male mold under only the pressure of the weight of the male mold to form the molded construction. In a particularly preferred embodiment, the protective layer and the first filter layer of electret or triboelectret material is formed in a die set as described above, then the second filter layer is formed in a separate step in either the same die set used to form the protective and first layers or in a second die set having dimensions slightly smaller than the first die set so that the molded second filter layer construction fits readily into the outer molded construction.

Still referring to FIG. 3, a substantially planar filter layer 27 is located adjacent to and covering the cavity 28 in the molded construction 20, and the planar filter layer 27 is sealed to the molded construction 20 by a perimeter seal 29.

The outer perimeter seal may be a heat seal or ultrasonic seal of the thermoplastic or thermoset layers. Alternately, a sealant, such as an adhesive, may be used to form the outer perimeter seal, but care should be exercised to avoid any seal material that may outgas during manufacturing or in use. A preferred seal can be obtained with a DuKane Model 351 Autotrace with a 40 khz rating. A weld for 0.95 second hold time at a pressure of 85 psi on the perimeter followed by a 2.8 second hold or cooling time effects an adequate seal with a Delnet 0707 polypropylene scrim, a GORE-TRET® recirculation media and two layers of expanded PTFE on polypropylene scrim (0.020 inch thick screen, 43.5 strands per inch).

Figure 4:
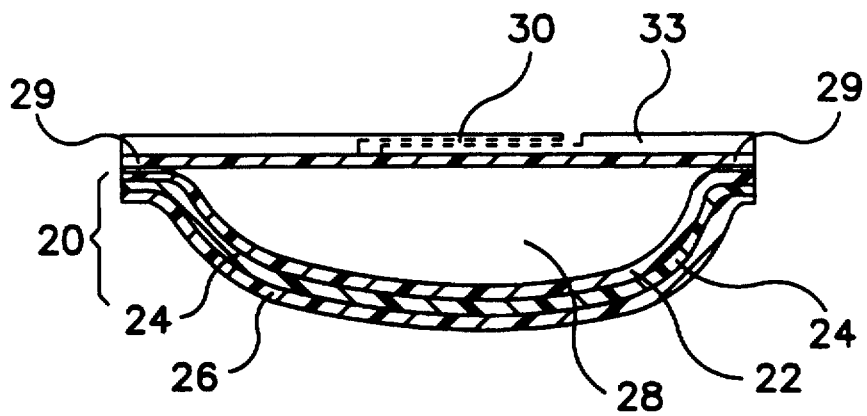
FIG. 4 is a cross-sectional view of another embodiment of the present invention incorporating a diffusion tube.

FIG. 4 shows a cross-section of an alternate filter of the present invention which incorporates the features of FIG. 3 along with an adhesive layer 33 incorporating a diffusion tube 30. The optional diffusion tube may have any suitable construction which creates a tortuous path for air entering through a breather hole in a disk drive. A preferred diffusion tube which may be used in conjunction with the present invention is that taught in U.S. Pat. No. 5,417,743, to Dauber, specifically incorporated herein by reference. Alternatively, the filter may be placed over a diffusion tube which is located in the disk drive housing, rather than on the filter.

Figure 5:
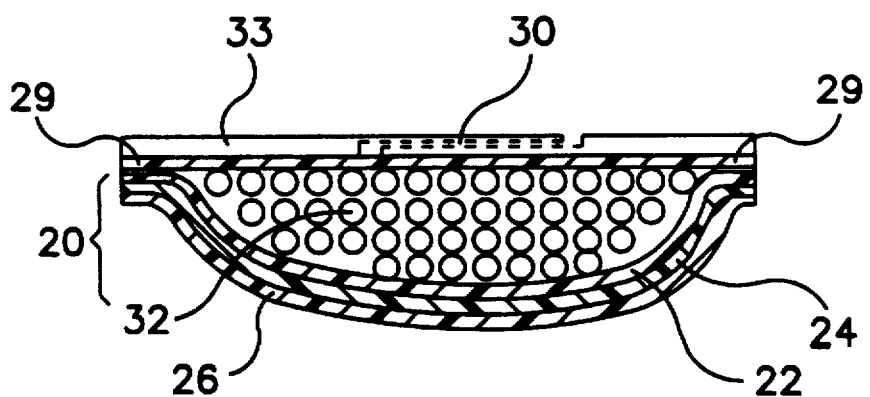
FIG. 5 is a top view of a further embodiment of the present invention incorporating both adsorbent and a diffusion tube.

FIG. 5 shows a further alternative embodiment of the present invention, in which in addition to the features shown in FIG. 4, the filter further includes an adsorbent 32 within the cavity of the filter.

The terms "adsorbent" and "adsorb" are not intended to be limiting with respect to the manner or mechanism of vapor entrapment. That is, the terms are intended to refer to materials mechanisms whereby vapors are entrapped, whether it be adsorption, absorption or some other mechanism. Examples of suitable adsorbent materials that may be contained within the adsorbent layer include: physisorbers (e.g. silica gel, activated carbon, activated alumina, molecular sieves, etc.); chemisorbers (e.g. potassium permanganate, potassium carbonate, potassium iodide, calcium carbonate, calcium sulfate, sodium carbonate, sodium hydroxide, calcium hydroxide, powdered metals or other reactants for scavenging gas phase contaminants); ion exchange materials; catalytic fillers; as well as mixtures of these materials.

Further, the adsorbent may comprise one or more layers of 100% adsorbent materials, such as granular activated carbon, activated carbon fabric or fibers, or may be a filled product matrix such as a scaffold of porous polymeric material compounded with adsorbents that fill the void spaces. Other possibilities include adsorbent impregnated non-wovens or beads on a scrim where the non-woven or scrim may be cellulose or polymeric and may include latex or other binders as well as porous castings or tablets of adsorbents and fillers that are polymeric or ceramic. The adsorbent may also be a mixture of different types of adsorbents. The adsorbent may further comprise unique geometries which present high surface area for contact with the air in the drive, and thus enhanced adsorption, such as those geometries described and shown in more detail herein.

For some applications, it may be desirable to employ multiple layers of adsorbent materials, with each layer containing different adsorbents to selectively remove different contaminants as they pass through the filter.

Figure 6:
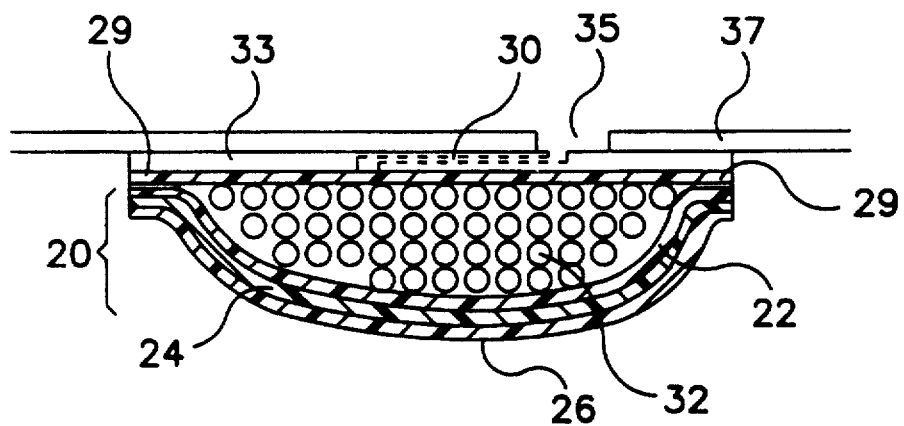
FIG. 6 shows the filter of FIG. 5 mounted over a breather hole in a disk drive housing.

FIG. 6 shows the filter of FIG. 5 mounted over a breather hole 35 and adhered to a disk drive housing 37.

Figure 7:
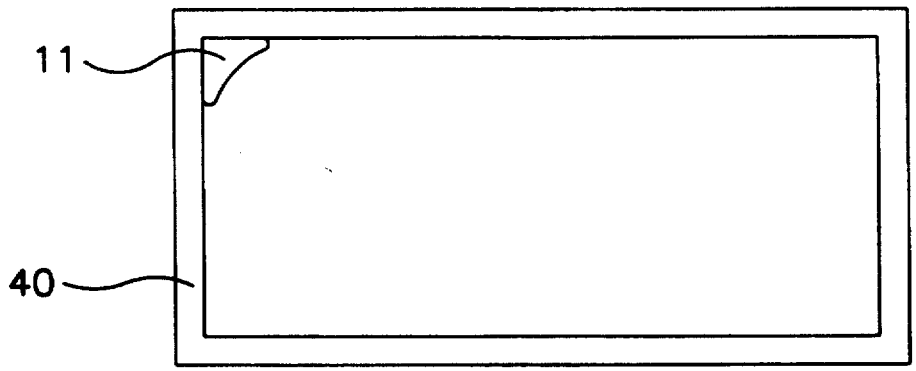
FIG. 7 is a top view of one embodiment of the present invention wherein a gasket for sealing a disk drive is attached to the filter.

Referring to an alternative embodiment of the present invention, FIG. 7 shows a filter element 11 of the present invention adhered to a gasket material 40 which may be incorporated to seal the housing components of a disk drive. Any suitable gasket material may be used in this embodiment.

Figure 8:
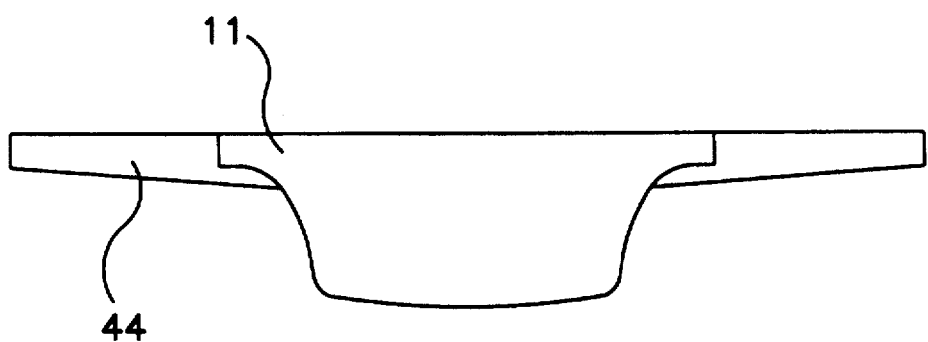
FIG. 8 is a top view of one embodiment of the present invention wherein a dampening material for reducing vibration in a disk drive is attached to the filter.

FIG. 8 shows a further alternative embodiment of the present invention wherein the filter element 11 of the present invention is adhered to a dampening material 44 for reducing vibration within the disk drive housing. Any suitable dampening material may be used in this embodiment.

Not only are the filters of the present invention simple to use and install, but another advantage of such devices is that the filters are not only low in outgassing and nonvolatile residues, but also low in particulation. In addition, depending on the construction, the filters can have the added benefit that they can be washed with deionized water to remove surface ionic contamination and particulation to improve their suitability for those applications requiring cleanliness, such as in computer disk drives, without washing out beneficial treatments such as salts which remove acid gases from the air streams. This washability is accomplished by using hydrophobic filter materials (along with impermeable layers such as adhesives, etc.) to surround the adsorbent layers. "Hydrophobic" as used in this application means the filter materials have a water (or water with surfactant if one is used) entry pressure sufficient to withstand the conditions of conventional washing steps, such as heating, stirring, ultrasonics, etc.

The present invention consolidates filtration functions which were previously performed by two, three, or more filters into a single filter having a novel construction that functions well, is easy to install, is clean and cleanable. Additionally, further components, such as a gasket or gasket(s) or vibration dampening materials, can be included to further reduce the number of components required for final assembly of a disk drive.

Various examples of the present invention can be described and illustrated in the accompanying drawings and discussions.

Test Procedures

Filters formed in the examples of the present invention were tested for adsorption and particulate filtration performance using a commercially available 3.5 inch form factor disk drive (Model Number 90845D4, Maxtor Corporation, Longmont, Colo.). All drive components except the motor were removed prior to modification of the drive for incorporation of the device. Modification consisted of drilling a breather hole (of approximately 1/16 inch diameter) in the baseplate allowing communication of the internal drive environment with the external environment via the device, and drilling two 1/4 inch diameter holes in the drive lid to allow introduction of contaminants and sampling of the internal drive atmosphere. Each of the holes in the lid was covered with a stainless steel fitting, which was centered over the hole and attached and sealed using 5 minute two-component epoxy. The fittings were 1/4 inch NPT female to 1/8 inch Swagelok male adapters (Part No. SS-200-7-4, Baltimore Valve and Fitting Co., Baltimore, Md.). The drive was cleaned using isopropanol and pressurized air to remove any oils and particulates created during modification. The head suspension assemblies were removed from the E-block prior to reassembly into the drive in order to eliminate the possibility of head crashes during testing. All components were then reassembled into the drive prior to sealing and testing.

Recirculation Filtration Test:

This test is designed to measure the effectiveness of a recirculation filter in reducing the particle concentration inside a disk drive from an initial state in which the drive has been charged with particles. The performance of the recirculation filter is quantified in terms of a cleanup time, which is the time required to reduce the particle counts to a fixed percentage of their initial value.

Figure 9:
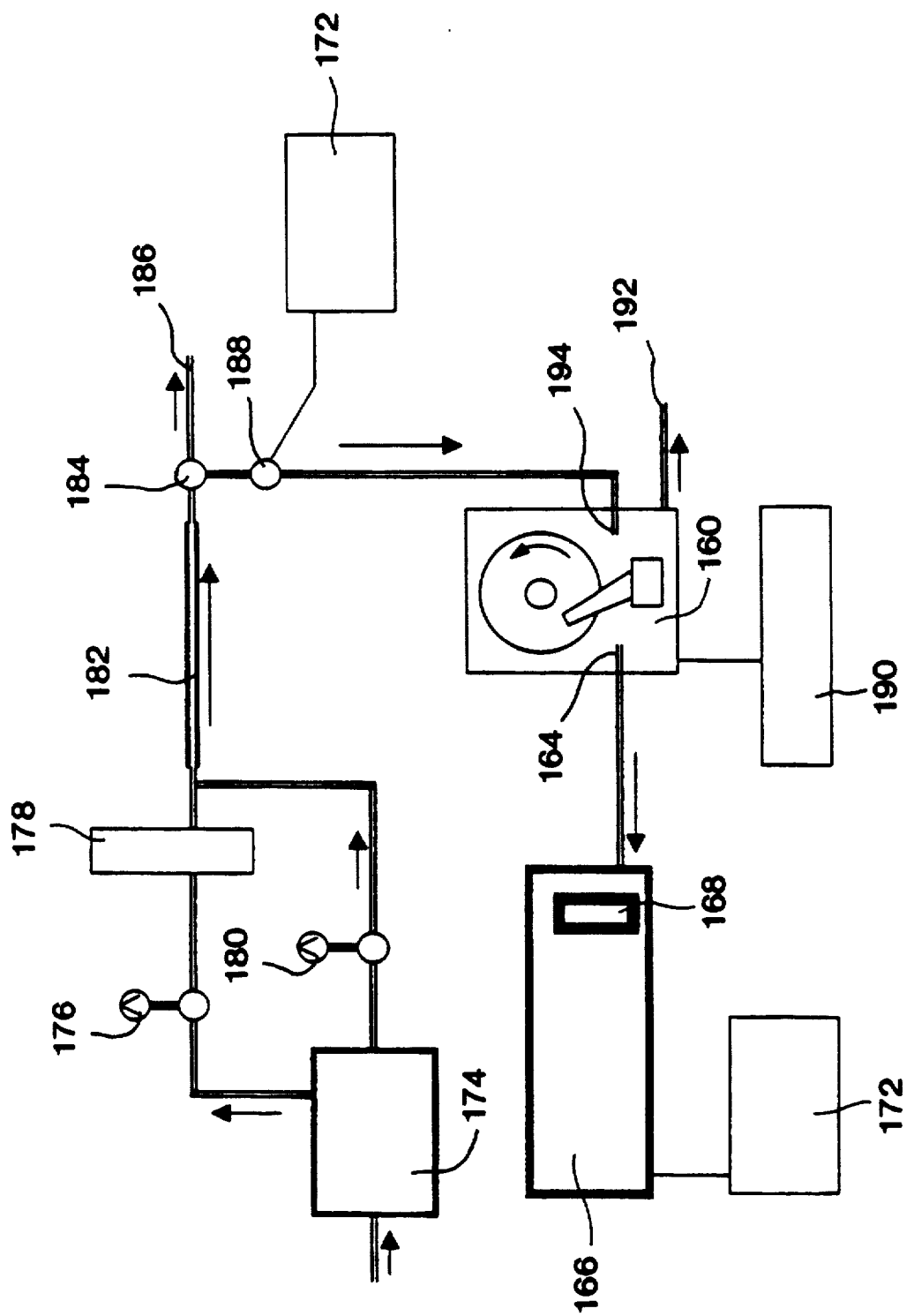
FIG. 9 is a schematic of the particle capture apparatus used to test the filters in accordance with the test descriptions contained herein.

For testing the effectiveness of the recirculation filter function the multi-functional filter was tested in the modified disk drive 160, as schematically illustrated in FIG. 9. The existing breather hole in the drive was left uncovered in order to provide a means for venting 192 any overpressure from the drive and to allow air to enter the drive during periods when the drive environment was being sampled without air being purposefully introduced into the drive. The lid was fastened securely to the base plate. A tube supplying an aerosol mixture of 0.1 μm and 0.3 μm particles was connected to the port in the drive lid which was upstream 194 of the filter based on the direction of disk rotation. A second tube for sampling the internal atmosphere of the drive connected the laser particle counter 166 (LPC) to the port 164 in the drive lid which was downstream of the filter. Sample flow rate out of the drive and through the counter 166 was maintained at 1 cc/sec and sheath flow through the LPC 166 was maintained at 40 cc/sec. Counts of 0.1 μm and 0.3 μm particles were obtained once per second by the LPC 166 and stored on a computer 172 disk drive for later analysis. The test was performed with the drive 160 located in a laminar flow hood fitted with a HEPA filter in the air intake, in order to maintain a controlled test environment with an extremely low ambient particle concentration. A control drive of the same model and also having had its head suspension assemblies removed and containing no recirculation filter was tested.

The recirculation filter test consisted of the following sequence: With the drive 160 powered on and clean air passing through the drive, the counts of 0.1 μm and 0.3 μm particles were monitored until a low background count was achieved, typically when 0.3 μm particles were less than 3 counts per second and 0.1 μm particles were less than 10 counts per second. At that point in time, the aerosol was flowed into the drive 160 in order to charge the internal environment with particles. When fully charged and stabilized, counts of 0.1 μm particles were typically between 10000 and 20000 per second and counts of 0.3 μm particles were typically between 3000 and 6500 per second. The flow of aerosol into the drive 160 was then halted while sampling of the internal drive atmosphere continued, by drawing out of the drive air which entered through the open breather hole in the base plate as well as any leaks in the lid or base plate. The concentration of 0.1 μm and 0.3 μm particles was observed to drop over time due to the recirculation of air through the drive and the filter, impaction of the particles on surfaces inside the drive, and the gradual exchange of particle-laden air with clean air drawn in through the breather hole. Monitoring of the drive 160 continued until the particle counts dropped to the initial background values observed prior to charging the drive with aerosol. The concentration of 0.1 μm and 0.3 μm particles was observed to drop over time due to the recirculation of air through the drive and the filter, impaction of the particles on surfaces inside the drive, and the gradual exchange of particle-laden air with clean air drawn in through the breather hole.

Breather Filtration Test:

This test is designed to measure the effectiveness of a breather filter in reducing the particle concentration inside a disk drive when the drive is placed in an environment heavily laden with fine particles and air is forcibly drawn into the drive. The performance of the breather filter is quantified by an efficiency, which is the percentage reduction in particle concentration between the external and internal environments of the drive.

The filter of the Example was tested in the modified disk drive, and the pre-existing breather hole in the drive was covered with metallized tape. The lid was fastened securely to the base plate and tape was applied over the screw holes in the lid as well as along the periphery of the drive to seal off any extraneous leaks. A control drive, of the same model and also having had its head suspension assemblies removed, contained no breather filter. The pre-existing breather hole in the base plate was left uncovered in the control drive to simulate an imperfectly sealed drive.

Figure 10:
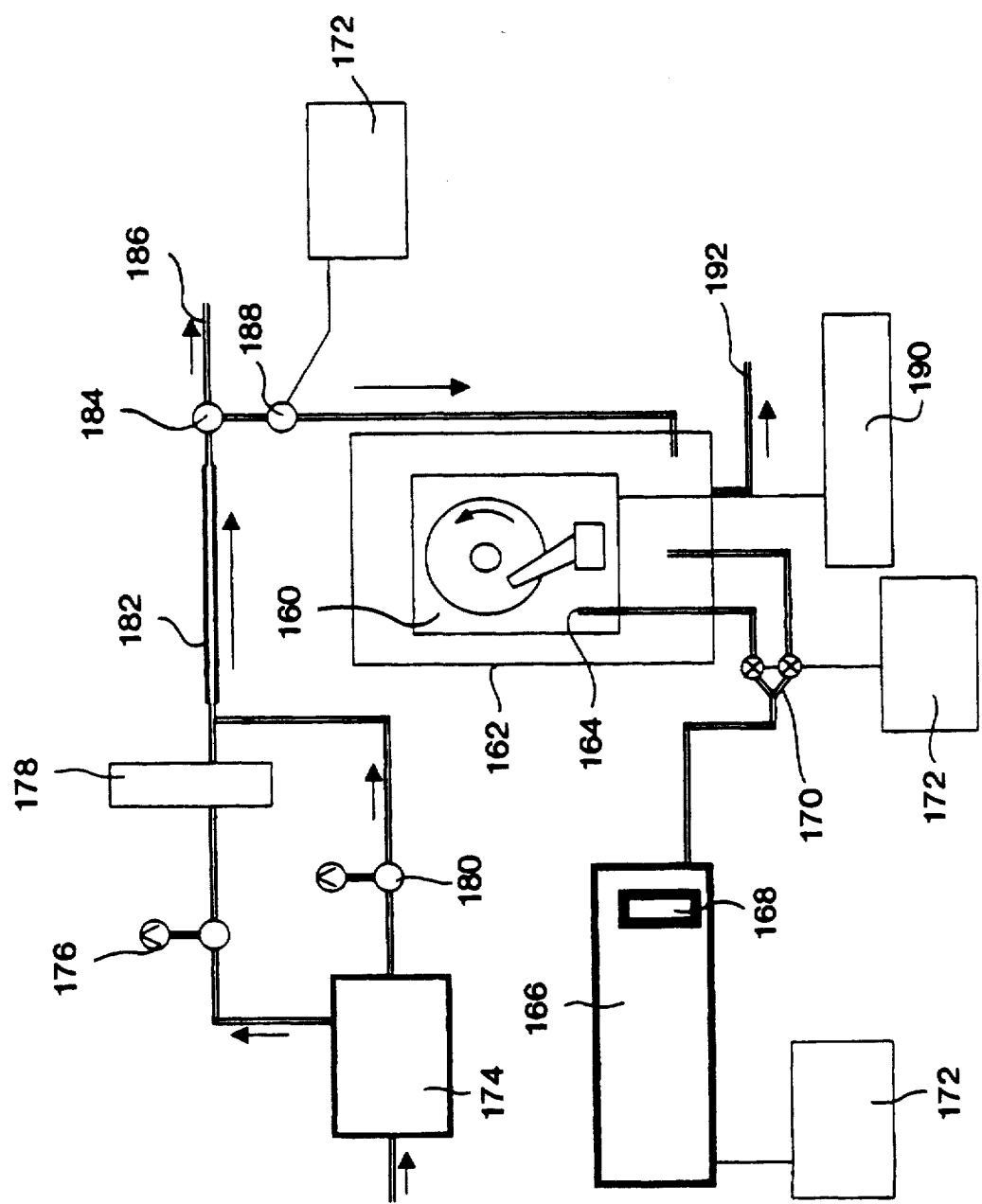
FIG. 10 is a schematic of the breather performance apparatus used to test the filters in accordance with the test descriptions contained herein.
Figure 11:
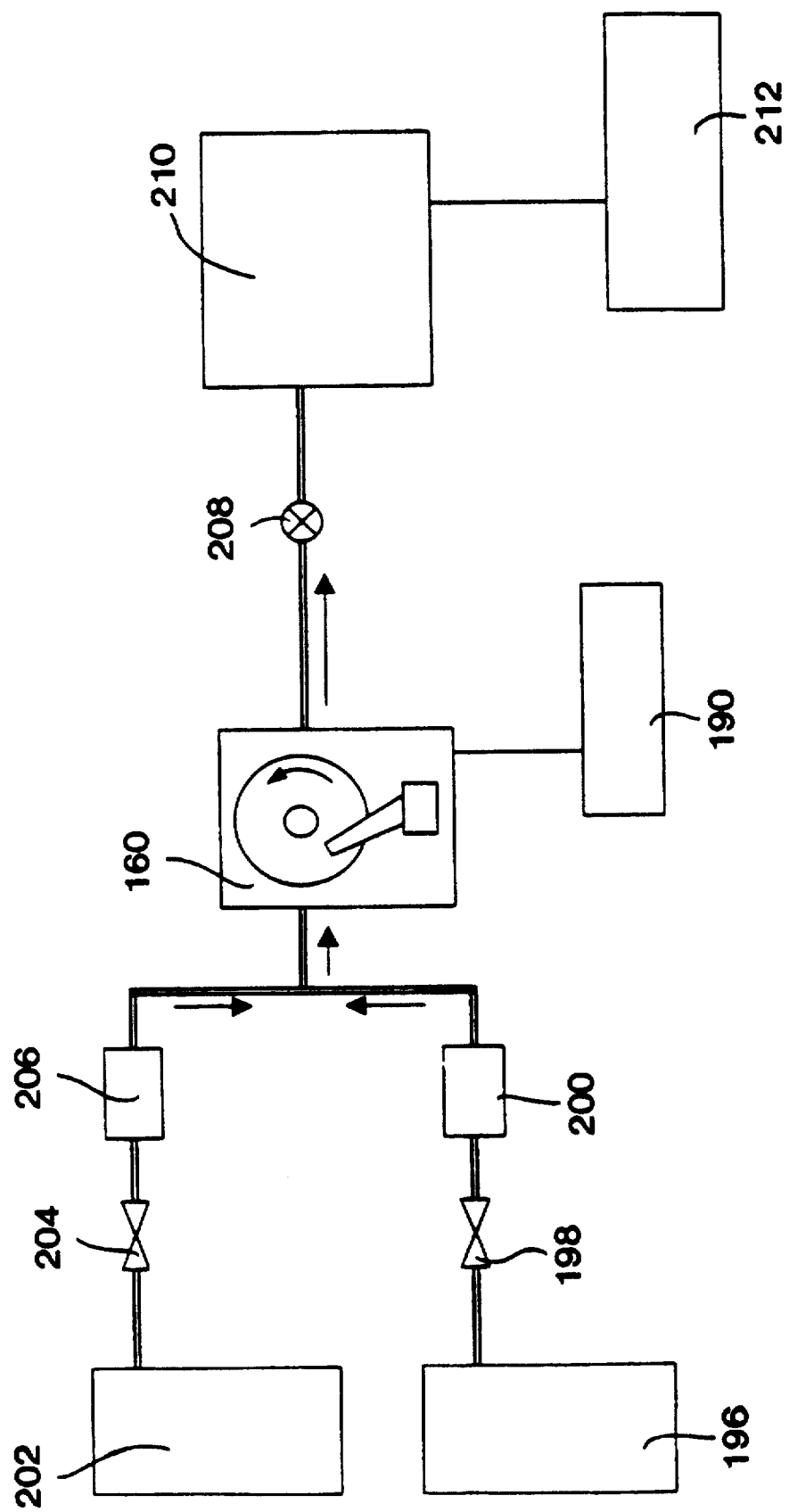
FIG. 11 is a schematic of the vapor phase contaminant capture apparatus used to test the filters in accordance with the test descriptions contained herein.

As schematically illustrated in FIG. 10, the disk drive 160 was placed inside a stainless steel box 162. One of the two ports in the lid (that which was upstream of the filter based on the direction of disk rotation) was capped to prevent air flow through the fitting. The downstream port 164 was connected using a ⅛ inch outside diameter flexible tube to a port in the wall of the metal box 162, which was connected on the outside of the box via tubing to a laser particle counter (LPC) 166 (Model LAS-X, Particle Measuring Systems, Inc., Boulder, Colo.). Sample flow rate out of the drive 160 and through the LPC 166 was maintained using a flow meter and valve 168 at 1 cc/sec and sheath flow through the LPC 166 was maintained at 40 cc/sec. A second port in the wall of the metal box 162 was connected to a 6 inch length of ¼ inch inner diameter flexible tubing opening onto the interior of the box. The line for sampling the atmosphere in the box was also connected to the LPC 166. The two lines running from the box to the LPC were each connected to a length of flexible tubing passing through a valve 170 which was electronically controlled by computer 172 to simultaneously close off one line while opening the second. Upon exiting the selector valve 170 the two lines met in a 'Y' junction, allowing the LPC 166 to sample one line at a time. A third port in the wall of the metal box 162 was used for the introduction of an aerosol into the internal environment of the box. The aerosol stream passed through a fitting in the port and then was divided into two streams, each of which flowed through a separate tube and entered the box through three gas dispersion tubes (Part Number P-06614-25, Cole-Parmer Instrument Company, Vernon Hills, Ill.). The aerosol consisted of an aqueous suspension of 0.1 μm and 0.3 μm diameter polystyrene latex (PSL) spheres (Catalog Number 5010A and 5030A, Duke Scientific Corporation, Palo Alto, Calif.) which provided an approximately 5:1 ratio of 0.1 μm to 0.3 μm particles as sampled from the metal box 162. The aerosol was generated by passing filtered compressed air 174 at a regulated (regulator 176) pressure of 39 psi (2.7× 105 Pa) through an atomizer 178 containing the suspension, and further mixing this with a stream of air 180 regulated to 2 psi (1.38×104 Pa). The aerosol was subsequently passed through a drying tube 182 to evaporate water from the droplets, creating a stream composed primarily of discrete particles. Flow of the dried aerosol stream was controlled by a manual valve 184, allowing a portion of the stream to vent to atmosphere 186 and then through an electrical on/off valve 188 controlled by computer 172. Electrical power 190 to the drive was provided by an electrical connection through a fourth port through the wall of the metal box 162 which was not sealed tightly in order to provide a means for venting to atmosphere 192 any overpressure from the box 162.

After the drive 160 was placed in the box 162 and the connections made for power and air sampling, a gasketed lid was clamped securely to the top of the box 162. Breather tests were performed with both the drive motor off and on. In the case of tests where the motor was on, proper motor function was tested prior to sealing the box 162, and then verified during testing by measuring the current through the electrical power wires using a current probe.

The breather filter test was performed as follows: The aerosol flow was turned on at the beginning of the test and remained on throughout the duration of the test. Initially, the box was charged with particles for 120 seconds. Then the box was sampled for 180 seconds in order to allow the particle counts to stabilize, and during which time no data was recorded. Subsequently, the number of 0.1 μm and 0.3 μm particles from the box were counted and recorded every 5 seconds for 100 seconds. Next, the drive was allowed to settle for 180 seconds and then sampled every 5 seconds for 100 seconds. The box and drive were monitored for two additional cycles in this same manner, each time allowing 180 seconds for stabilization of the counts and 100 seconds of sampling for both box and drive. Typical levels of the aerosol particles as sampled from the metal box were between 11500 and 18000 per 5 second interval for 0.1 μm particles and between 2200 and 3700 per 5 second interval for 0.3 μm particles.

The data recordings were analyzed by obtaining the average particle counts for the box and the drive for each of the three cycles. The efficiency for each cycle was calculated using the following formula:

%Efficiency={[Average (Box)−Average (Drive)]/Average (Box)}*100%

The three efficiency values were then averaged together to obtain the overall breather filter efficiency. This analysis was performed separately for 0.1 μm and 0.3 μm particles.

Disk Drive Adsorption Test:

This test is designed to measure the effectiveness of a multi-functional filter in reducing the concentration of a volatile organic contaminant, toluene, inside a disk drive relative to the concentration of toluene in an inlet stream flowing into the drive. The performance of the multi-functional filter is quantified by calculating the percentage of the inlet concentration of toluene detected in the drive vapor space.

Figure 12:
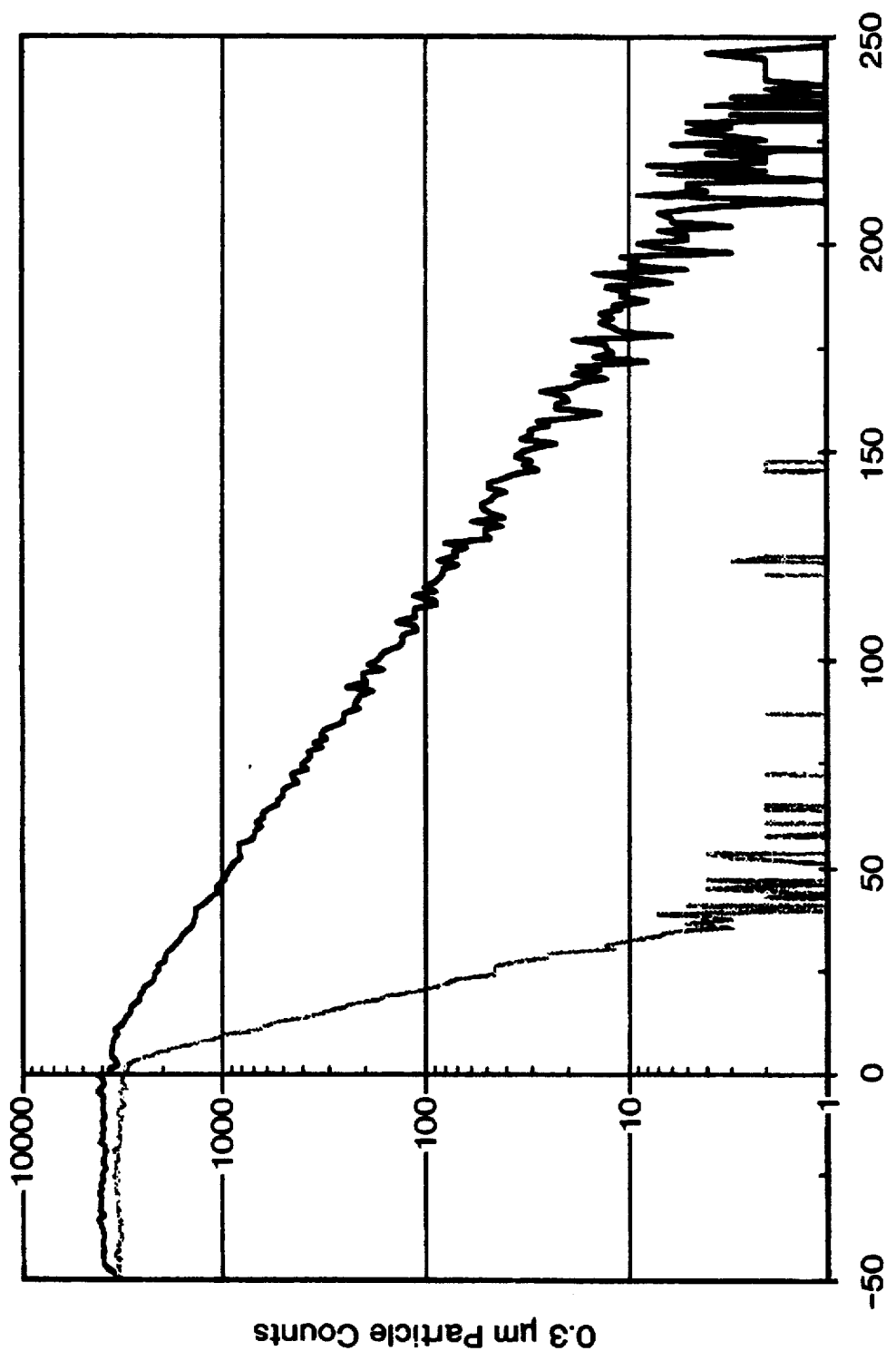
FIG. 12 is a graph showing the particle capture efficiency for the filter described in Example 1.

The device was tested in the modified disk drive 160, as shown in FIG. 12. In addition to the two ports made in the drive lid, a 1/16 inch outside diameter rigid TEFLON® tube (obtained from Cole-Parmer Instrument Company, Vernon Hills, Ill.) was inserted from the outside through the bottom of the base plate into the breather hole, to create a third port. The penetration of this tube into the breather hole was limited in such a manner that the end of the tube remained below the internal surface of the base plate. An airtight seal was created around the external juncture between the tube and the base plate using two-component epoxy. Following these further modifications of the drive 160, the filter of the Example was mounted into the base plate as earlier described, such that the hole in the bottom adhesive was located over the breather hole specially made for testing the device. The pre-existing breather hole in the drive was covered with metallized tape. The remaining components were then reassembled into the drive. The drive was resealed, and adhesive tape was used to seal all potential paths for significant air leaks. A control drive of the same model which contained no adsorbent was also tested.

The drive motor was continuously spinning during all testing. The disk drive 160 was purged with clean dry air to verify that initial toluene concentration was 0 ppm. One of the three ports into the drive was capped off. Clean dry air 196 was passed through a pressure regulator 198 and mass flow controller 200 to generate an air stream at a constant volumetric flow rate of 40 ml/min, flowing into one of the two other ports on the drive 160. The remaining port was connected to a flow meter to monitor for any flow loss. The outlet flow into the flow meter was measured to be at least 95% of the inlet stream, and thus the drive was considered adequately sealed for testing.

For testing adsorbent breather functionality of the multi-functional filter, 100 ppm toluene in nitrogen 202 was passed through a pressure regulator 204 and mass flow controller 206, and mixed with clean dry air to generate a room temperature stream of 25 ppm toluene in air. This toluene stream was flowed directly into the part, through the tube adhered to the breather hole, at a volumetric flow rate of 40 ml/min. One of the two ports in the lid was closed with a cap. Rigid TEFLON® tubing was used to connect the second port in the lid via a sampling valve 208 to a gas chromatograph equipped with a flame ionization detector (FID) 210 to monitor toluene concentration inside the drive. The data recordings were collected on a personal computer 212 and analyzed by calculating a percentage from the ratio of the sampled concentration and a nominal inlet concentration of 25 ppm over the duration of the test. For testing the adsorbent recirculation functionality of the filter, a cap was used to seal the tube entering the breather hole over which the device was situated. The pre-existing breather hole in the drive 160 remained sealed with metallized tape. A room temperature stream of 25 ppm toluene in clean dry air was then flowed into the drive 160 through the port in the lid which was upstream of the test sample, at a volumetric flow rate of 40 ml/min. The second port in the lid was connected to the FID 210 with rigid TEFLON® tubing, in order to monitor toluene concentration inside the drive. The data were analyzed by calculating a percentage from the ratio of the sampled concentration and a nominal inlet concentration of 25 ppm over the duration of the test.

Passive Disk Drive Adsorption Test

This test is designed to measure the initial adsorption uptake of a volatile organic contaminant, toluene, by an adsorbent filter under static conditions, i.e., adsorption under constant gas/vapor concentration without significant convective gas flow. The performance of the adsorbent filter is quantified in terms of an adsorption rate, which is the average weight increase of the adsorbent filter per unit time.

For measuring the passive adsorption uptake, the rigid multi-functional filter of the Example was adhered to a small sheet of plastic which covered the entire bottom surface, such that the entrance to the diffusion tube was completely sealed off. A small hole had been punched in a portion of the plastic sheet protruding out from under the filter, which was used to suspend the filter from a hook attached to the microbalance. The glass sample chamber was sealed around the sample. Water from a constant temperature bath was circulated through a jacket surrounding the sample chamber until the system reached a steady temperature of 25° C. The chamber was then flushed with clean dry air until the microbalance recorded a constant weight, signifying the elimination of moisture from the sample.

To start the vapor adsorption process, the microbalance was tared, and a mixture of toluene and air was passed through a flow controller and allowed to flow into the chamber from below and out through a vent at the top. The toluene stream had a flow rate of 1 liter/min and a concentration of 25 ppm by volume. Based on this volumetric flow rate and the cross-sectional area of the sample chamber, the linear flow velocity was calculated to be around 0.9 mm/second. This linear flow velocity was chosen based on the assumption that it would be sufficiently low to prevent convective flow through the device, which may possibly have an impact on the adsorption rate. The weight of the device was monitored for several hours and recorded using a computer-based data acquisition system. The data recordings were analyzed by performing a linear regression through the weight data for the device vs. time. The resulting slope provides a measure of the passive adsorption rate through the openings in the filter, which would be in direct fluid communication with the interior of a disk drive.

Particle Removal Test

A Maxtor Diamond Max Model number 9084504 disk drive was purchased. The disk drive was opened and the heads removed. In addition, the post in the corner to support the existing recirculation filter was removed. The filters tested were each adhered to the base casting in the same location as the previously existing recirculation filter.

The disk drive was then resealed. The disk drive was purged and then challenged with a flow of 0.3 and 0.1 micron particles. The number of particles in the disk drive was allowed to come to equilibrium and then the flow of particles was stopped. The rate of decay of particles in the drive air space was recorded as the filter collected the particles. In this test the more efficient the filter, the lower the time to get to 99.9% removal.

EXAMPLES

Example 1

A filter of the present invention having a generally rounded triangular geometry to fit into a corner of a disk drive and with general dimensions of 2.0 cm by 1.7 cm by 3.0 cm was manufactured as described below.

Three layers consisting of, respectively, a Delnet 0707 polypropylene scrim (Applied Extrusion Technologies, Inc., Middletown, Del.), a Reemay B2004 non-woven polyester (Reemay, Inc., Old Hickory, Tenn.), and an electrostatic felt material consisting of GORE-TRET® recirculation media (available from W. L. Gore and Associates, Inc., Elkton, Md.) were placed over a female die having the general dimensions of 2.0 cm by 1.7 cm by 3.0 cm so that the scrim material faced the female die. The 3.0 cm dimension was shaped to mirror the die with a radius of curvature of 4.9 cm. The general shape of the part is a right triangle with a radius of curvature of 0.8 cm replacing the 90 degree angle. The female die had 6 vacuum holes located with the die set and was at room temperature. The layers were placed over the female die, the female die was placed inside an ultrasonic sealer and the vacuum was turned on and pulled through the 6 vacuum holes. A male die made 0.2 mm smaller than each of the overall dimensions of the female die was heated to 340° F. The female and male die set was placed in a Model Phase II Arbor Press. The male die was then gently pressed into the female die. No additional pressure except the weight of the die was used. By this step, a form was made from the layered sheets having the shape of the mold and having a cavity therein.

A two layer laminate of polypropylene/ePTFE membrane was then placed on top of the molded form so that it covered the cavity to form a substantially planar filter layer lid. The laminate was formed using an ePTFE membrane having an 0.2 micron average pore size, a thickness of 0.0027–0.0039 inches and a Gurley number that ranged from 10–18 sec. The polypropylene was a 0.020 inch thick screen with biaxially oriented fibers at an 80 degree angle to each other. The strand count was an average of 43.5 strands/inch. The lamination was carried out by heat and pressure at conditions of 220° C. and 50 psia. The polypropylene side of the laminate was oriented toward the molded part containing the adsorbent.

The two layer laminate was bonded to the molded part in the following manner. The ultrasonic sealer was a DuKane model 351 Autotrace with a 40 khz rating. The following settings were used on the ultrasonic equipment: The dial was set to maximum power with an 85 psi seal pressure. The trigger pressure setting was 1.45. The hold time was 2.8 seconds with a weld time of 0.95 sec.

An adhesive layer of double-sided adhesive tape comprising two layers 0.001" thick (0.025 mm) of permanent high temperature, low outgassing, acrylic pressure sensitive adhesive on both sides of a two mil polyester film carrier was placed on the outer surface of the substantially planar filter layer to secure the filter to a disk drive during testing. The resulting filter was tested in the manner described herein.

Example 2

A self adhesive adsorbent filter having the features generally shown in FIG. 1 was formed, in which one side of the filter was shaped to mirror the curvature of the disk. The filter was manufactured using the following process and materials.

Three layers of material, as described in Example 1, were placed over a female die having the general dimensions of 2.0 cm by 1.7 cm by 3.0 cm so that the scrim material faced the female die. The 3.0 cm dimension was shaped to mirror the die with a radius of curvature of 4.9 cm. The general shape of the part is a right triangle with a radius of curvature of 0.8 cm replacing the 90 degree angle. The female die had 6 vacuum holes located with the die set and was at room temperature. The layers were placed over the female die, the female die was placed inside an ultrasonic sealer and the vacuum was turned on and pulled through the 6 vacuum holes. A male die made 0.2 mm smaller than each of the overall dimensions of the female die was heated to 340° F. The female and male die set was placed in a Model Phase II Arbor Press. The male die was then gently pressed into the female die. No additional pressure except the weight of the die was used. By this step, a form was made from the layered sheets having the shape of the mold and having a cavity therein.

A second molded component was formed from a laminate of expanded PTFE and polypropylene backer. The laminate was formed from a membrane having an 0.2 micron average pore size, a thickness of 0.0027–0.0039 inches and a Gurley number that ranged from 10–18 sec. The polypropylene was a 0.020 inch thick screen with biaxially oriented fibers at an 80 degree angle to each other. The strand count was an average of 43.5 strands/inch. The lamination was carried out by heat and pressure at conditions of 220° C. and 50 psia. A female mold having a shape substantially the same as the first female mold mentioned above, except that the mold had dimensions of 1.850 cm by 1.550 cm by 2.850 cm, was obtained having six vacuum holes therein. The laminate was placed over the female die, the female die was placed inside an ultrasonic sealer and the vacuum was turned on and pulled through the 6 vacuum holes. The female mold was at room temperature during this procedure. A male die having dimensions which were 0.2 mm smaller than the dimensions of the female die was heated to 340° F. and placed into the female die so that the laminate was held between the die set. The die set was placed in the Arbor Press described above and the male die was gently pressed into the female die. No additional pressure except the weight of the die was used. By this step, a second form was made from the layered sheets having the shape of the mold and having a cavity therein.

The second form was then placed inside the first form which was still in the first female die, and the assembly was placed in the ultrasonic sealer. The vacuum was turned on, and an adsorbent comprising 500 mg of loose activated carbon was then placed in the cavity of the second form. The activated carbon had an average diameter of 0.6 mm, a 1200 $m^2$/gram specific surface area, and 0.57 cc/gram pore volume.

A two layer laminate of the same polypropylene/ePTFE membrane used to make the second form was then placed on top of the molded forms so that it covered the adsorbent fill to form a lid comprising a substantially planar filter layer. The polypropylene side of the laminate was oriented toward the molded part containing the adsorbent.

The substantially planar two layer laminate was bonded to the molded part containing the adsorbent in the following manner. The ultrasonic sealer was a DuKane Model 351 Autotrace with a 40 khz rating. The following settings were used on the ultrasonic equipment: The dial was set to maximum power with an 85 psi seal pressure. The trigger pressure setting was 1.45. The hold time was 2.8 seconds with a weld time of 0.95 sec.

An adhesive layer comprising two layers 0.001" thick (0.025 mm) of permanent high temperature, low outgassing, acrylic pressure sensitive adhesive on both sides of a two mil polyester film carrier was placed on the outer surface of the substantially planar filter layer to secure the filter to a disk drive during testing. The resulting filter was tested in the manner described herein.

Example 3

A filter was made as described in Example 2. Onto the substantially planar filter lid of the filter was adhered a diffusion tube made with a layer of double-sided adhesive tape comprising two layers 0.001" thick (0.025 mm) of permanent high temperature, low outgassing, acrylic pressure sensitive adhesive on both sides of a two mil polyester film carrier. The diffusion tube hole was cut into this layer and configured to mate one end to the hole through the drive base plate. This hole, along with a majority of the diffusion tube length, was covered with a single sided adhesive tape comprising a layer of 0.001" (0.025 mm) thick permanent high temperature, low outgassing, acrylic pressure sensitive adhesive on a 0.002" (0.051 mm) thick polyester carrier. The other end of the diffusion tube was left uncovered to allow airflow through the filter layers and into the drive. An exposed adhesive layer on the diffusion tube was used to secure the filter to a disk drive during testing. The resulting filter was tested in the manner described herein.

Example 4

A filter as shown generally in FIG. 6 was formed having a shape on one side to mirror the curvature of the disk. The filter was manufactured using the process and materials described below.

A laminate of expanded PTFE and polypropylene backer was formed. The laminate was formed from a the membrane having an 0.2 micron average pore size, a thickness of 0.0027–0.0039 inches and a Gurley number that ranged from 10–18 sec. The polypropylene was a 0.020 inch thick screen with biaxially oriented fibers at an 80 degree angle to each other. The strand count was an average of 43.5 strands/inch. The lamination was carried out by heat and pressure at conditions of 220° C. and 50 psia.

The laminate was placed over a female die having the general dimensions of 2.0 cm by 1.7 cm by 3.0 cm so that the scrim material faced the female die. The 3.0 cm dimension was shaped to mirror the die with a radius of curvature of 4.9 cm. The general shape of the part is a right triangle with a radius of curvature of 0.8 cm replacing the 90 degree angle. The female die had 6 vacuum holes located with the die set and was at room temperature. The layers were placed over the female die, the female die was placed inside an ultrasonic sealer and the vacuum was turned on and pulled through the 6 vacuum holes. A male die made 0.2 mm smaller than each of the overall dimensions of the female die was heated to 340° F. The female and male die set was placed in a Model Phase II Arbor Press. The male die was then gently pressed into the female die. No additional pressure except the weight of the die was used. By this step, a form was made from the layered sheets having the shape of the mold and having a cavity therein.

A three layer construction was then laid over the same female die set described above. The three layers, consisting of, respectively, a Delnet 0707 polypropylene scrim (Applied Extrusion Technologies, Inc., Middletown, Del.), a Reemay B2004 non-woven polyester (Reemay, Inc., Old Hickory, Tenn.), and an electrostatic felt material consisting of GORE-TRET® recirculation media (available from W. L. Gore and Associates, Inc., Elkton, Md.) were placed over the female die so that the scrim material faced the female die. The same steps as described above were used to mold the three layers into the shape of the die set.

The ePTFE laminate made in the first step was placed inside the molded tri-layer construction. The two forms were then placed inside the female die form inside a ultrasonic sealer, and the vacuum was turned on. An adsorbent comprising 500 mg of silica gel and 200 mg of treated activated carbon was placed inside the molded cavity.

A layer of the same laminate of polypropylene/ePTFE used in the first step of the example was placed on top of the molded part so that it covered the adsorbent fill with the polypropylene layer toward the molded part to form a substantially planar filter lid. The lid was then sealed onto the part with an ultrasonic sealer to complete the assembly. Specifically, the ultrasonic sealer was a DuKane model 351 Autotrace with a 40 khz rating. The following settings were used on the ultrasonic equipment. The dial was set to Max power with an 85 psi seal pressure. The trigger pressure setting was 1.45. The hold time was 2.8 seconds with a weld time of 0.95 sec.

Onto the substantially planar filter lid of the filter was adhered a diffusion tube made with a layer of double-sided adhesive tape comprising two layers 0.001" thick (0.025 mm) of permanent high temperature, low outgassing, acrylic pressure sensitive adhesive on both sides of a two mil polyester film carrier. The diffusion tube hole was cut into this layer and configured to mate one end to the hole through the drive base plate. This hole, along with a majority of the diffusion tube length, was covered with a single sided adhesive tape comprising a layer of 0.001" (0.025 mm) thick permanent high temperature, low outgassing, acrylic pressure sensitive adhesive on a 0.002" (0.051 mm) thick polyester carrier. The other end of the diffusion tube was left uncovered to allow airflow through the filter layers and into the drive. An exposed adhesive layer on the diffusion tube was used to secure the filter to a disk drive during testing. The resulting filter was tested in the manner described herein.

A number of the filters made in the Examples above were subjected to the Particle Removal test described earlier herein. The results are shown below.

|  | seconds to 99.9% particle removal (0.3 micron) | | | |
| --- | --- | --- | --- | --- |
|  | Run | | | |
| Filter | 1 | 2 | 3 | Average |
| No filter | 203 | 198 | 200 | 200 |
| Filter - Example 1 | 38 | 40 | 40 | 39 |
| Filter - Example 2 | 52 | 53 | 56 | 54 |
| Filter - Example 4 | 77 | 72 | 75 | 75 |

FIG. 12 is a graph depicting the time (in seconds) required to remove 0.3 micron particles from the disk drive with no recirculation filter (darker line) and with the filter described in Example 1 (lighter line).

Figure 13:
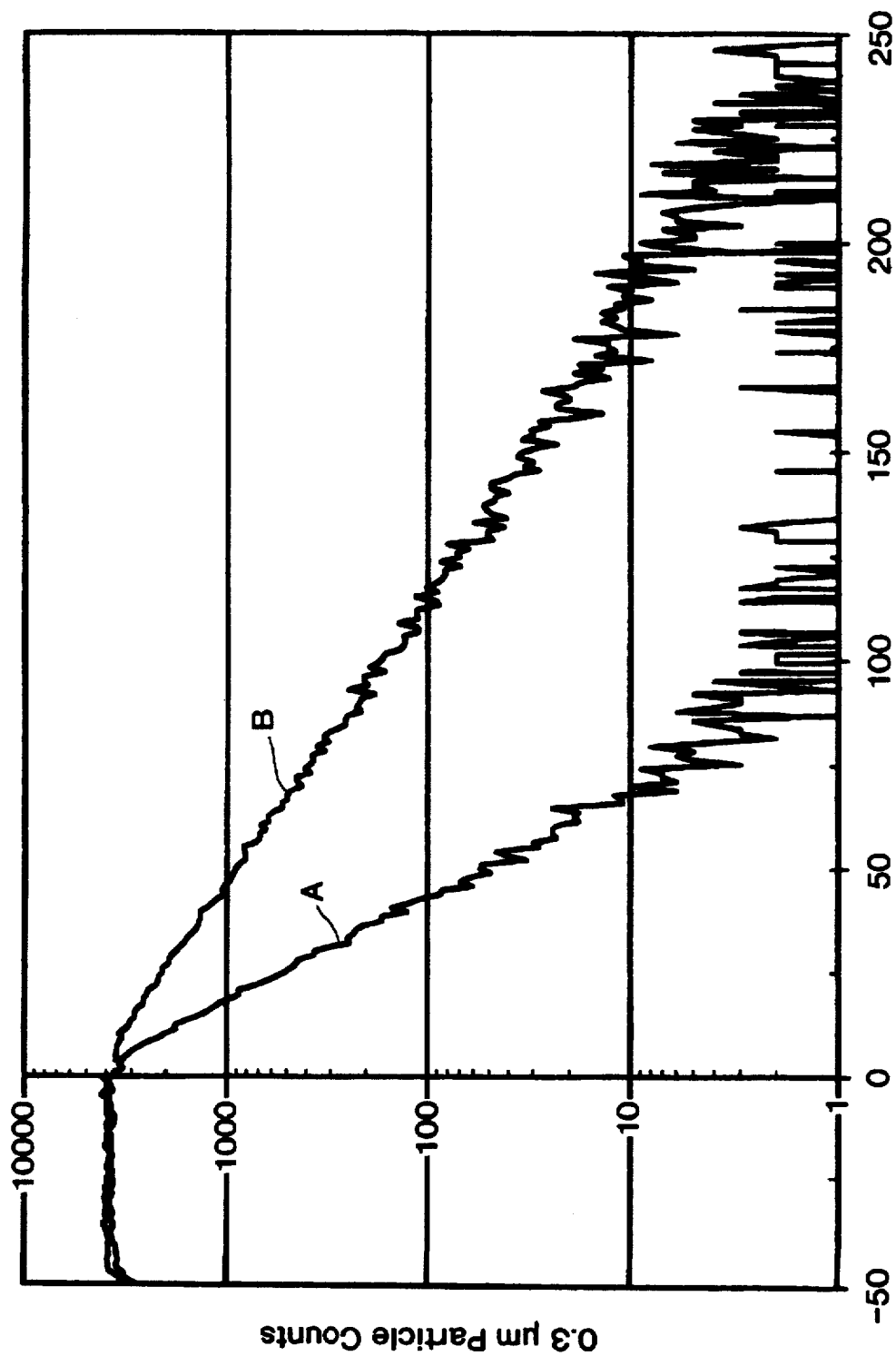
FIG. 13 is a graph showing the particle capture efficiency for the filter described in Example 3.
Figure 14:
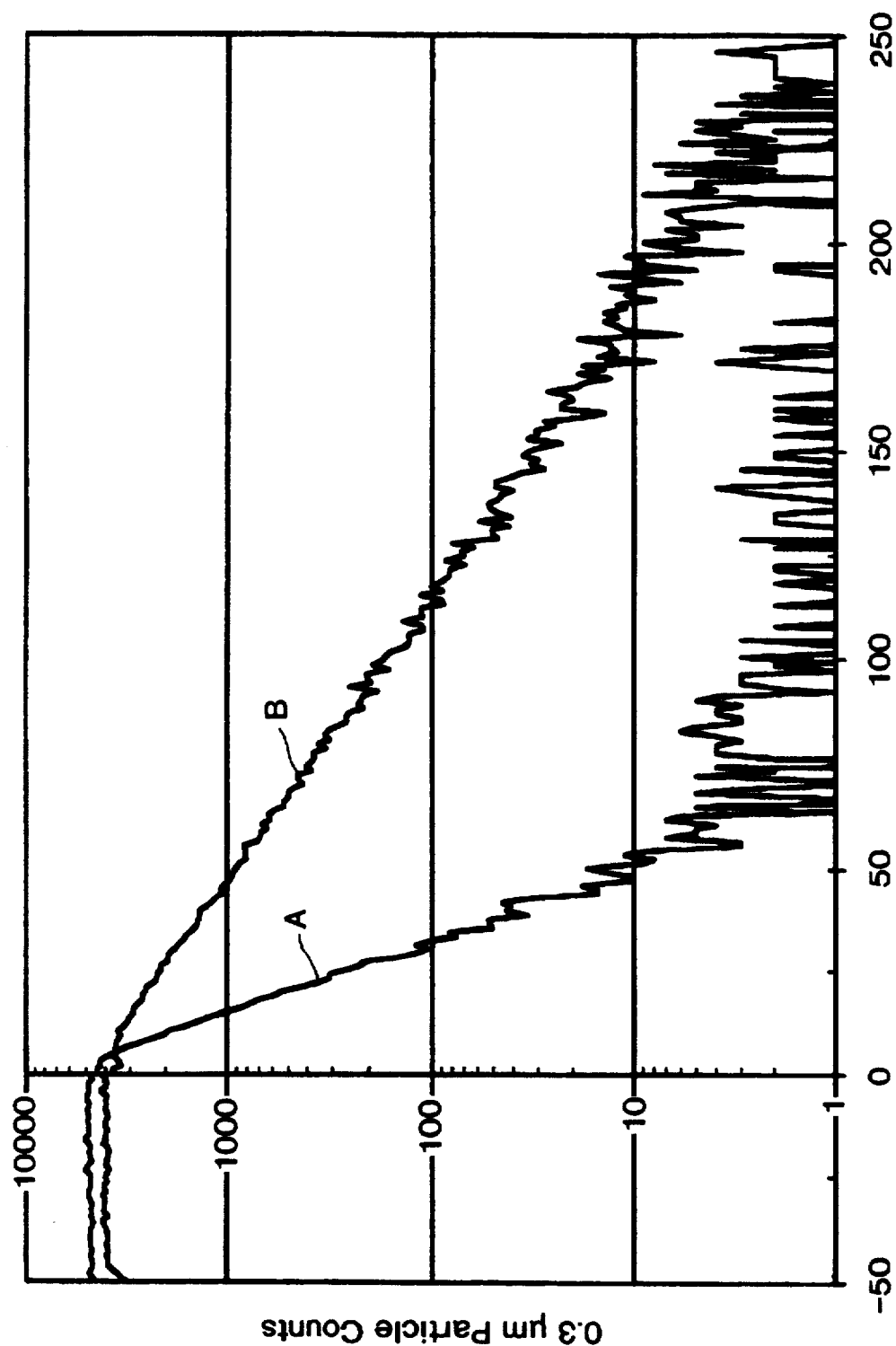
FIG. 14 is a graph showing the particle capture efficiency for the filter described in Example 4.

FIG. 13 is a graph depicting the time (in seconds) required to remove 0.3 micron particles from the disk drive with no recirculation filter(darker line) and with the filter described in Example 3 (lighter line). FIG. 14 is a graph depicting the time (in seconds) required to remove 0.3 micron particles from the disk drive with no recirculation filter(darker line) and with the filter described in Example 4 (lighter line).

The breather filter functionality of the filters made in the Example 4 was tested using the procedure described earlier herein. Testing was performed both with the drive running (both breather filter and recirculation filter functioning), as well as with the drive not running when mostly the breather filter alone was functioning. The following results in Table 2 were obtained for three repetitive runs at each condition with the averages and % cleanup efficiencies calculated:

TABLE 2

| | (0.1 micron particles) | | (0.3 micron particles) |
| --- | --- | --- | --- |
| Run number | Percent efficiency of filter | Run number | Percent efficiency of filter |
| Motor on | | | |
| Run 1 | 99.93 | Run 1 | 99.95 |
| Run 2 | 99.95 | Run 2 | 99.95 |
| Run 3 | 99.95 | Run 3 | 99.95 |
| Average | 99.94 | Average | 99.95 |
| Motor off | | | |
| Run 1 | 99.86 | Run 1 | 99.85 |
| Run 2 | 99.87 | Run 2 | 99.90 |
| Run 3 | 99.87 | Run 3 | 99.90 |
| Average | 99.87 | Average | 99.88 |

This illustrates the breather filter functions well and the combination recirculation filter and breather filter (drive on condition) performs better than either filter alone.

Figure 15:
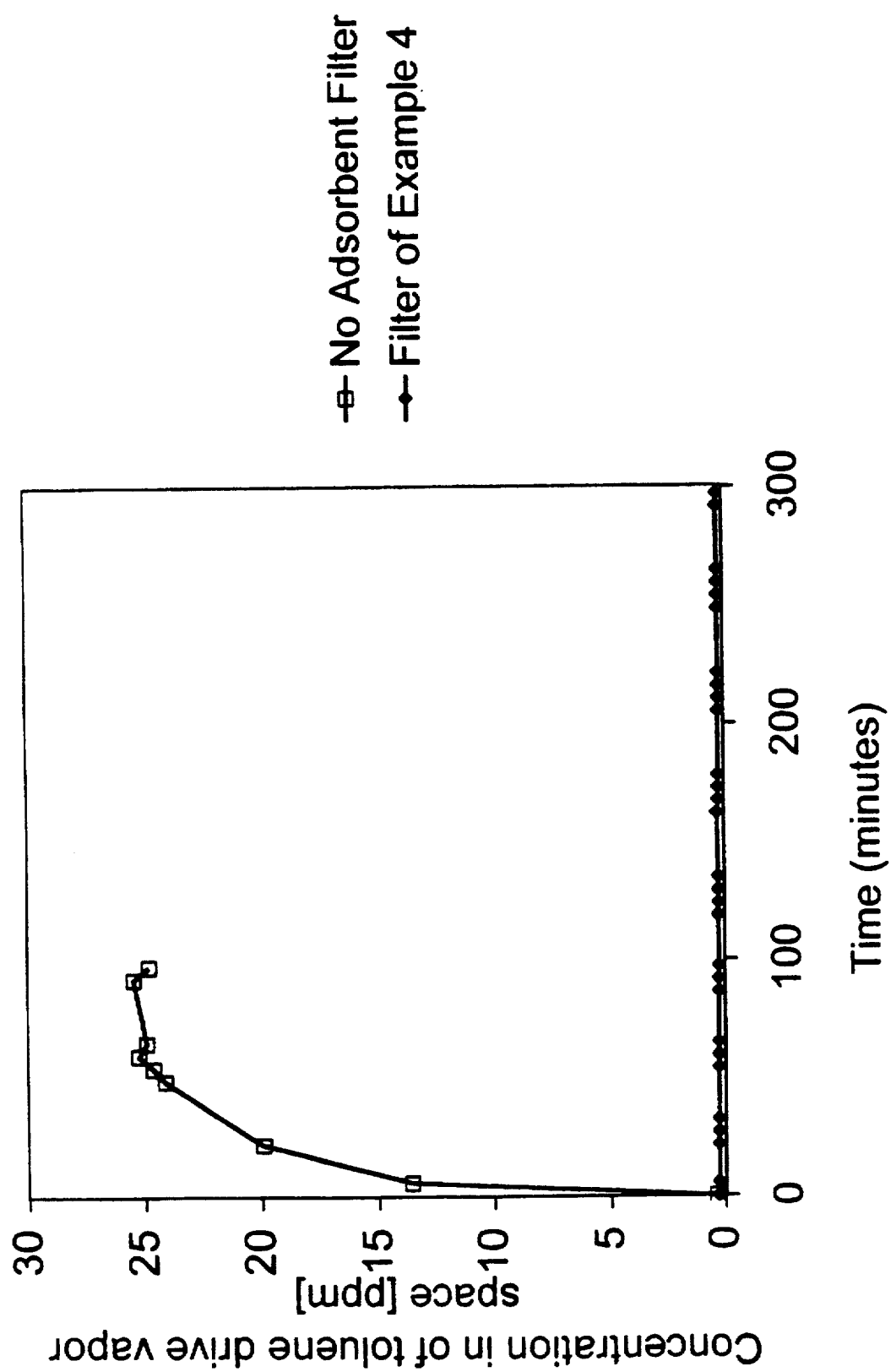
FIG. 15 is a graph showing adsorbent breather performance of the filter described in Example 4.

The adsorption breather functionality of the filter of Example 4 was then tested as previously described by forcing air with 25 ppm of toluene through the filter described in Example 4, a standard non-adsorbent breather and an adsorbent breather filter for comparison. The result is shown in FIG. 15 plotting the current invention versus a standard particulate non-adsorbent breather filter, illustrating that the filter of the current invention performs as an adsorbent breather is expected to function to adsorb the toluene.

Figure 16:
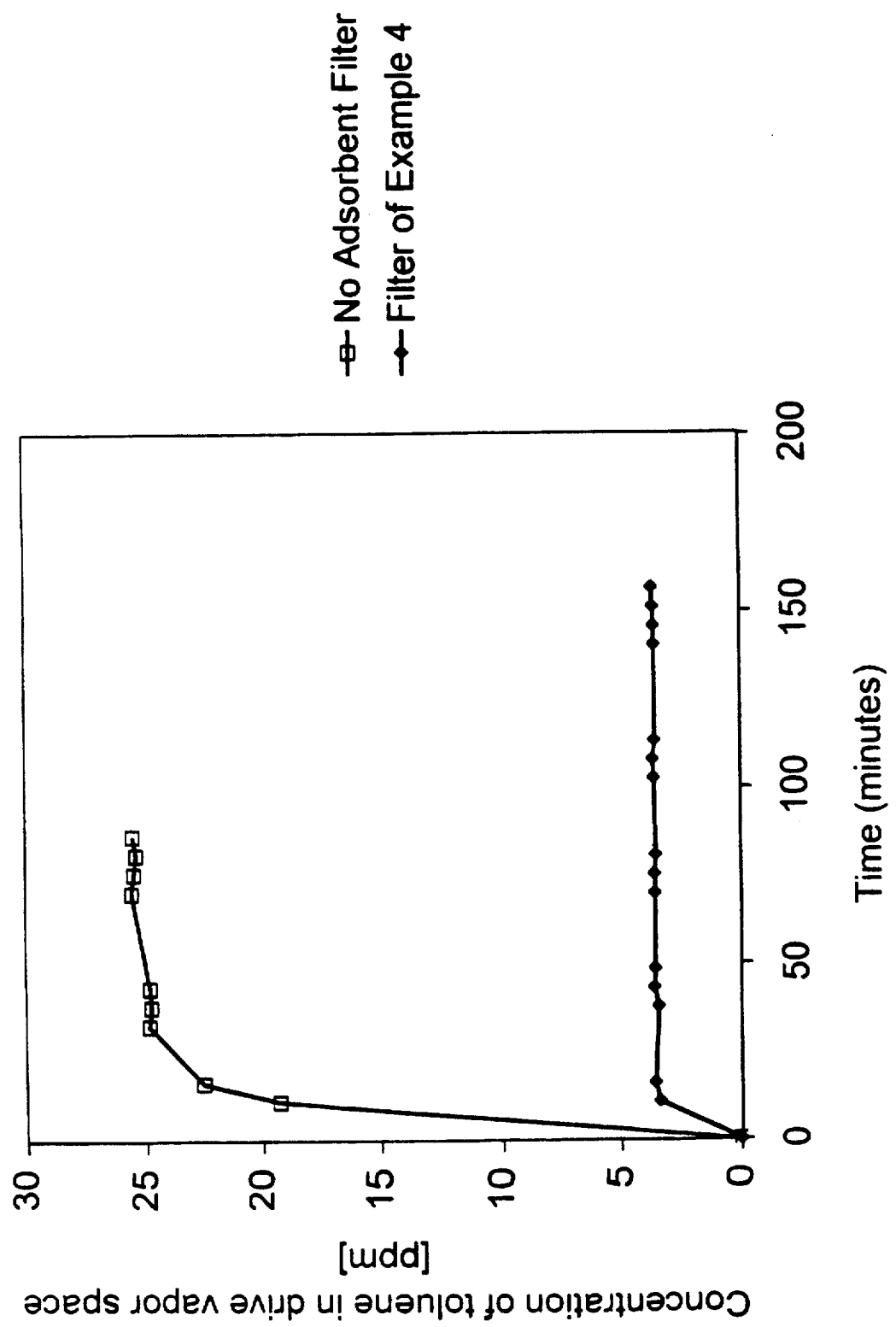
FIG. 16 is a graph showing the organic material (toluene) adsorption performance of the filter described in Example 4.

The organic adsorption functionality of the filter made in Example 4 for adsorbing contaminants in the recirculating air around the filter was then tested as previously described by loading the drive with a steady stream of toluene laden air and sampling the drive when running with and without the filter. The result is shown in FIG. 16 illustrating that the filter is capable of adsorbing the toluene in the recirculating air and keeping the drive about 90% cleaner compared to a drive in which no filter was present.

Figure 17:
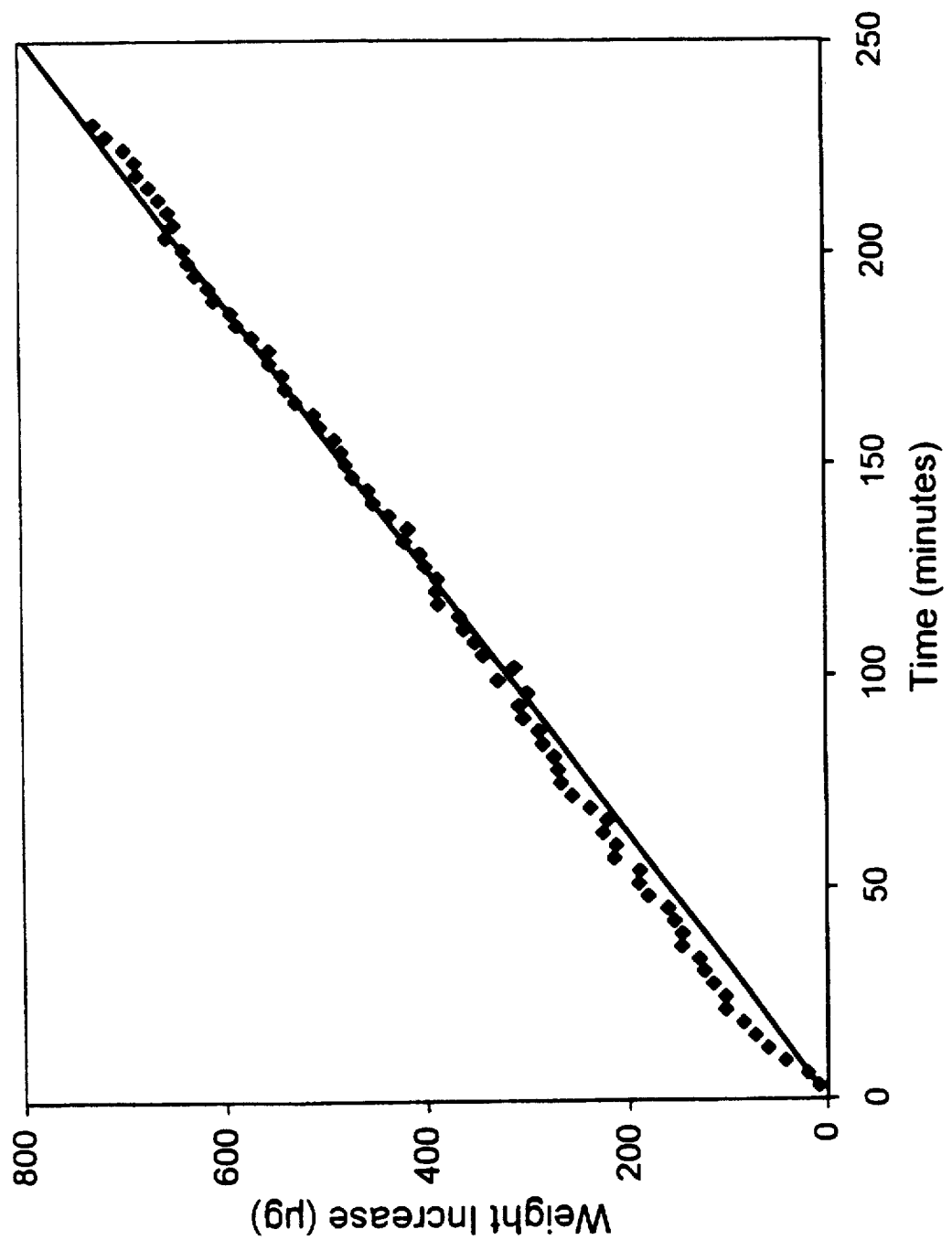
FIG. 17 is a graph showing the weight gain per unit time of the filter described in Example 4 when subjected to a passive adsorption test.

The filter of Example 4 was further tested in a passive adsorption test as previously described. The weight gain per unit time is shown in FIG. 17 illustrating that the filter works in a passive mode and will adsorb contaminants outgassing from the internal drive components in a passive or at-rest (non-operating) state.

While particular embodiments of the present invention have been illustrated and described herein, the present invention should not be limited to such illustrations and descriptions. It should be apparent that changes and modifications may be incorporated and embodied as part of the present invention within the scope of the following claims.

I claim:

1. A filter adapted for filtering particulates present within and particulates entering through a breather hole in an enclosed environment housing sensitive equipment, comprising:

a layered construction comprising at least one protective support layer, at least one first filter layer selected from the group consisting of an electret material and a triboelectret material, and at least one second filter layer, said construction being molded so that it has a permanent three-dimensional shape defining a cavity therein;

at least one substantially planar filter layer adjacent said cavity; and a perimeter seal sealing the layered construction to the at least one substantially planar filter layer, whereby when the filter is located within the enclosed environment and positioned over the breather hole, the filter is capable of filtering particulates entering and within the enclosed environment.

2. The filter of claim 1, wherein said at least one second filter layer comprises expanded polytetrafluoroethylene membrane.

3. The filter of claim 1, wherein said substantially planar filter layer comprises expanded polytetrafluoroethylene membrane.

4. The filter of claim 1, wherein said filter further comprises an adsorbent material within said cavity, and said filter is capable of filtering gaseous contaminants entering and within the enclosed environment.

5. The filter of claim 1, wherein said filter further comprises a diffusion tube adjacent said substantially planar filter layer.

6. The filter layer of claim 5, further comprising an adhesive layer on at least a portion of said diffusion tube for adhering said filter to said enclosed environment.

7. The filter of claim 4, wherein the adsorbent material comprises a material selected from the group consisting of silica gel, activated carbon, activated alumina, molecular sieves, clays and superabsorbent fibers.

8. The filter of claim 4, wherein the adsorbent material comprises a material selected from the group consisting of calcium carbonate, calcium sulfate, potassium permanganate, sodium carbonate, potassium carbonate, sodium phosphate and activated metals.

9. The filter of claim 4, wherein the adsorbent material is a polymeric scaffold that is impregnated with an adsorbent.

10. The filter of claim 9, wherein the polymeric scaffold is selected from the group consisting of membranes of polypropylene, polyethylene, polyvinylidene fluoride, polyvinyl alcohol and polyethylene terepthalate.

11. The filter of claim 9, wherein the scaffold is expanded polytetrafluoroethylene.

12. The filter of claim 1, wherein said at least one protective layer is selected from the group consisting of a scrim, a woven and a nonwoven material.

13. The filter of claim 1, wherein the at least one second filter layer is selected from polypropylene, nylon, a composite of polycarbonate and polyester, mixed cellulose ester, polyvinyl chloride and cellulose triacetate.

14. The filter of claim 1, wherein the at least one substantially planar filter layer is selected from polypropylene, nylon, a composite of polycarbonate and polyester, mixed cellulose ester, polyvinyl chloride and cellulose triacetate.

15. The filter of claim 1, further comprising an adhesive layer on at least a portion of said substantially planar filter layer for adhering said filter to said enclosed environment.

16. The filter of claim 1, wherein said filter further includes a gasket for sealing said enclosed environment.

17. The filter of claim 1, wherein said filter further includes a damping material for reducing vibration within the enclosed environment.

18. The filter of claim 1, wherein said first filter layer comprises a triboelectret material comprising clean porous polypropylene fibers and clean modified acrylic fibers.

19. A filter adapted for filtering particulates present within and particulates entering through a breather hole in an enclosed environment housing sensitive equipment, comprising:

a layered construction comprising at least one protective support layer comprising a polypropylene scrim material, at least one first filter layer comprising a triboelectret material comprising clean porous polypropylene fibers and clean modified acrylic fibers, and at least one second filter layer comprising expanded polytetrafluoroethylene membrane, said construction being molded so that it has a permanent three-dimensional shape defining a cavity therein;

an adsorbent material within said cavity;

at least one substantially planar filter layer comprising expanded polytetrafluoroethylene membrane adjacent said cavity;

a perimeter seal sealing the layered construction to the at least one substantially planar filter layer; and a diffusion tube adjacent said substantially planar filter layer, whereby when the filter is located within the enclosed environment and positioned over the breather hole, the filter is capable of filtering particulates entering and within the enclosed environment.

\* \* \* \* \*